US011887773B2

(12) United States Patent
Zhu et al.

(10) Patent No.: US 11,887,773 B2
(45) Date of Patent: Jan. 30, 2024

(54) COIL WINDING, COIL MODULE, TRANSMITTING APPARATUS, RECEIVING APPARATUS, SYSTEM, AND TERMINAL

(71) Applicant: Huawei Technologies Co., Ltd., Shenzhen (CN)

(72) Inventors: Yongfa Zhu, Dongguan (CN); Xiaowei Chen, Dongguan (CN); Zhiqiang Zeng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 612 days.

(21) Appl. No.: 17/158,629

(22) Filed: Jan. 26, 2021

(65) Prior Publication Data

US 2021/0151247 A1    May 20, 2021

Related U.S. Application Data

(63) Continuation of application No. PCT/CN2019/128685, filed on Dec. 26, 2019.

(30) Foreign Application Priority Data

May 24, 2019 (CN) .......................... 201910441832.X

(51) Int. Cl.
*H02J 7/00* (2006.01)
*H01F 27/32* (2006.01)
(Continued)

(52) U.S. Cl.
CPC ......... *H01F 27/32* (2013.01); *H01F 27/2823* (2013.01); *H01F 27/34* (2013.01);
(Continued)

(58) Field of Classification Search
USPC .......................... 320/106, 107, 108, 109, 110
See application file for complete search history.

(56) References Cited

U.S. PATENT DOCUMENTS

2015/0364248 A1    12/2015 Groves et al.
2016/0315502 A1    10/2016 King et al.
(Continued)

FOREIGN PATENT DOCUMENTS

CN    102760560 A  * 10/2012 ......... H01F 27/2823
CN    103715781 A    4/2014
(Continued)

OTHER PUBLICATIONS

Kim, et al., "New Structure for High Q-factor Printed Antenna in Wireless Power Transmission," IEEE Eurocon 2017, Jul. 6-8, 2017, Ohrid, R. Macedonia, 5 pages.

*Primary Examiner* — Brian Ngo
(74) *Attorney, Agent, or Firm* — Conley Rose, P.C.

(57) ABSTRACT

A coil winding includes a first part of coils and a second part of coils located on opposite sides of an insulation layer, where the first part of coils comprises a first segment of conducting wire, and the second part of coils comprises a second segment of conducting wire. The first segment of conducting wire and the second segment of conducting wire each includes N cutting openings. Both the first segment of conducting wire and the second segment of conducting wire are divided into N+1 sub conducting wires by the N cutting openings. The N+1 sub conducting wires in the first segment of conducting wire and the N+1 sub conducting wires in the second segment of conducting wire are electrically coupled in a one-to-one manner to form N+1 pairs of sub conducting wires including a crossover structure.

20 Claims, 18 Drawing Sheets

(51) Int. Cl.
*H02J 50/10* (2016.01)
*H01F 27/28* (2006.01)
*H01F 27/34* (2006.01)
*H02J 7/02* (2016.01)

(52) U.S. Cl.
CPC ............... *H02J 7/02* (2013.01); *H02J 50/10* (2016.02); *H01F 2027/348* (2013.01)

(56) References Cited

U.S. PATENT DOCUMENTS

| | | |
|---|---|---|
| 2017/0229900 A1 | 8/2017 | Cho et al. |
| 2019/0131056 A1 | 5/2019 | Ashizawa et al. |
| 2020/0279686 A1 | 9/2020 | Pei et al. |
| 2020/0312533 A1* | 10/2020 | Mori ..................... H01F 27/255 |
| 2021/0012959 A1* | 1/2021 | Pei .......................... H02J 50/10 |
| 2021/0151247 A1* | 5/2021 | Zhu ..................... H01F 27/2871 |

FOREIGN PATENT DOCUMENTS

| | | | | |
|---|---|---|---|---|
| CN | 107046333 A | | 8/2017 | |
| CN | 108321914 A | | 7/2018 | |
| CN | 108565102 A | | 9/2018 | |
| CN | 109461571 A | | 3/2019 | |
| CN | 109616303 A | | 4/2019 | |
| CN | 109961942 A | | 7/2019 | |
| CN | 110289156 A | | 9/2019 | |
| JP | 2005064044 A | * | 3/2005 | .......... G11B 5/3103 |
| JP | 2008166569 A | * | 7/2008 | |

\* cited by examiner

COIL WINDING, COIL MODULE, TRANSMITTING APPARATUS, RECEIVING APPARATUS, SYSTEM, AND TERMINAL

CROSS-REFERENCE TO RELATED APPLICATIONS

This application is a continuation of International Patent Application No. PCT/CN2019/128685 filed on Dec. 26, 2019, which claims priority to Chinese Patent Application No. 201910441832.X filed on May 24, 2019. The disclosures of the aforementioned applications are hereby incorporated by reference in their entireties.

TECHNICAL FIELD

This application relates to the field of wireless charging technologies, and in particular, to a coil winding, a coil module, a transmitting apparatus, a receiving apparatus, a system, and a terminal.

BACKGROUND

Currently, charging an electronic device using a wireless charging technology becomes increasingly popular. A device for implementing the wireless charging technology is referred to as a wireless charger. During specific implementation, the wireless charger is provided with a transmitting coil, the electronic device is provided with a receiving coil, an alternating current carried by the transmitting coil in the wireless charger generates a magnetic field, and the receiving coil in the electronic device generates a voltage through magnetic coupling, to charge the electronic device.

Because wireless charging is to transmit energy based on magnetic coupling between the transmitting coil and the receiving coil, a very strong magnetic field exists between the transmitting coil and the receiving coil. In this case, if a coil winding of a wireless charging coil (that is, the transmitting coil or the receiving coil) is relatively wide, a relatively large eddy current loss is generated in the coil winding when the magnetic field passes through the coil winding. To resolve this problem, as shown in FIG. 1, a wireless charging coil usually includes a coil winding and a cutting opening, and the cutting opening segments the coil winding into two small windings with relatively small widths. Because the width of each small winding is less than a width of the unsegmented coil winding, the eddy current loss of the coil winding can be reduced.

However, after the cutting opening segments the coil winding into the two small windings with relatively small widths, as shown in FIG. 2, when a current I flows through the coil winding, a current $I_1$ and a current $I_2$ that are in a same direction respectively flow through the two small windings. In this case, if a magnetic field passes through the cutting opening, induced currents $I_E$ that are in different directions are generated in the two small windings on two sides of the cutting opening due to electromagnetic induction. Consequently, a circulating current loss is generated in the coil winding, and further, wireless charging efficiency is decreased.

SUMMARY

This application provides a coil winding, a coil module, a transmitting apparatus, a receiving apparatus, a system, and a terminal, to resolve a problem of relatively low wireless charging efficiency in the related art. The technical solutions are as follows.

According to a first aspect, a coil winding is provided. The coil winding includes an insulation layer, a first part of coils located on one side of the insulation layer, and a second part of coils located on the other side of the insulation layer. The first part of coils includes a first segment of conducting wire, and the second part of coils includes a second segment of conducting wire. The first segment of conducting wire is provided with N cutting openings, and the first segment of conducting wire is divided into N+1 first sub conducting wires by the N cutting openings provided thereon. The second segment of conducting wire is also provided with N cutting openings, and the second segment of conducting wire is also divided into N+1 second sub conducting wires by the N cutting openings provided thereon. Each cutting opening extends along an extension direction of a corresponding segment of conducting wire, and N is an integer greater than or equal to 1. The N+1 first sub conducting wires and the N+1 second sub conducting wires are electrically connected in a one-to-one manner, to form N+1 pairs of sub conducting wires. At least one crossover structure is formed in the N+1 pairs of sub conducting wires, and each pair of sub conducting wires includes one first sub conducting wire and one corresponding second sub conducting wire.

It should be noted that the coil winding includes a plurality of turns of coils. The coil winding is a conductive pattern formed by winding a conductor. The conductive pattern may be circular shaped, oval ring shaped, or the like. Any one of the plurality of turns of coils of the coil winding is formed by evenly winding the conductor by 360 degrees. The coil winding is not a planar coil winding.

In addition, at least one crossover structure is formed in the N+1 pairs of sub conducting wires. Certainly, alternatively, at least two crossover structures may be formed in the N+1 pairs of sub conducting wires. For example, a crossover structure is formed between one pair of sub conducting wires and at least one other pair of sub conducting wires among the N+1 pairs of sub conducting wires. Alternatively, a crossover structure is formed between each pair of sub conducting wires and at least one other pair of sub conducting wires among the N+1 pairs of sub conducting wires. Alternatively, a crossover structure is formed between each pair of sub conducting wires and each pair of the other pairs of sub conducting wires among the N+1 pairs of sub conducting wires.

Furthermore, the first segment of conducting wire and the second segment of conducting wire are disconnected (or discontinuous), and the first segment of conducting wire and the second segment of conducting wire are respectively located on two sides of the insulation layer. The N+1 first sub conducting wires in the first segment of conducting wire and the N+1 second sub conducting wires in the second segment of conducting wire are connected in a one-to-one manner. For at least two pairs of sub conducting wires among the N+1 pairs of sub conducting wires formed by connecting the N+1 first sub conducting wires and the N+1 second sub conducting wires, one first sub conducting wire and one second sub conducting wire included in each pair of sub conducting wires do not belong to a same sub conducting wire, but are different sub conducting wires. In addition, projections of the at least two pairs of sub conducting wires on a plane on which the insulation layer is located are crossed.

In this embodiment of this application, a series crossover structure is formed between the first segment of conducting wire and the second segment of conducting wire of the coil winding which have the same quantity of cutting openings. That is, at least one crossover structure is formed in the N+1 pairs of sub conducting wires. In this case, when a magnetic field passes through the cutting openings between the N+1 pairs of sub conducting wires, in each of at least two pairs of sub conducting wires among the N+1 pairs of sub conducting wires, an induced current generated by one first sub conducting wire and an induced current generated by one corresponding second sub conducting wire are opposite in direction and therefore can at least partially cancel each other. This can effectively reduce a circulating current loss in the coil winding, thereby improving wireless charging efficiency of the coil winding.

A projection of the first segment of conducting wire on a plane on which the insulation layer is located and a projection of the second segment of conducting wire on the plane on which the insulation layer is located form a continuous line pattern. A length of the line pattern is greater than a length of a longer one of the first segment of conducting wire and the second segment of conducting wire, and is less than a sum of a length of the first segment of conducting wire and a length of the second segment of conducting wire.

It should be noted that, assuming that the projection of the first segment of conducting wire on the plane on which the insulation layer is located is a first projected line and the projection of the second segment of conducting wire on the plane on which the insulation layer is located is a second projected line, the first projected line and the second projected line are adjacent to each other and have a joint portion. The first projected line and the second projected line form a long continuous line pattern. The line pattern is the same as a projection, of a segment of long conducting wire located in a planar coil winding, on the plane on which the insulation layer is located. A plane on which the planar coil winding is located is substantially parallel to the plane on which the insulation layer is located, and a length of the segment of long conducting wire is approximately equal to the sum of the length of the first segment of conducting wire and the length of the second segment of conducting wire.

Optionally, N is an integer greater than or equal to 2. Then, the first segment of conducting wire is divided into at least three first sub conducting wires, and the second segment of conducting wire is also divided into at least three second sub conducting wires.

Optionally, an induced current generated by a magnetic field passing through the N cutting openings in the first segment of conducting wire and an induced current generated by a magnetic field passing through the N cutting openings in the second segment of conducting wire are opposite in direction and equal in size.

Further, to make the induced current generated by the magnetic field passing through the N cutting openings in the first segment of conducting wire and the induced current generated by the magnetic field passing through the N cutting openings in the second segment of conducting wire opposite in direction and equal in size, the first segment of conducting wire can be designed to be adjacent to the second segment of conducting wire, the first segment of conducting wire is g continuous turns of coils in the plurality of turns of coils of the coil winding, and the second segment of conducting wire is g continuous turns of coils other than the first segment of conducting wire in the plurality of turns of coils of the coil winding, where g is a positive number.

Optionally, the coil winding includes a plurality of turns of coils. In the plurality of turns of coils, a width of at least one turn of coil is greater than that of at least another turn of coil. The coil with a larger width has A cutting openings, and the A cutting openings divide the coil with a larger width into A+1 sub conducting wires. The coil with a smaller width has B cutting openings, and the B cutting openings divide the coil with a smaller width into B+1 sub conducting wires. Each of the cutting openings extends along an extension direction of a corresponding coil. A and B are both integers greater than or equal to 1, and A is greater than B. In short, coils of a same width have a same quantity of cutting openings, and a coil with a larger width has a larger quantity of cutting openings.

Optionally, a coil with a larger width is located on an outer side of a coil with a smaller width. Optionally, widths of the plurality of turns of coils gradually decrease from the outermost turn of coil to the innermost turn of coil.

Optionally, for two adjacent turns of coils of the coil winding that have different quantities of cutting openings, a cutting opening provided on one of the two turns of coils is connected to one of cutting openings provided on the other turn of coil, or none of cutting openings provided on one of the two turns of coils are connected to cutting openings provided on the other turn of coil.

Optionally, for two adjacent turns of coils of the coil winding that have different quantities of cutting openings, one turn of coil is located on one side of the insulation layer, and the other turn of coil is located on the other side of the insulation layer. That is, the two turns of coils are located on different planes.

According to a second aspect, a coil module is provided, including an insulation layer, a first coil winding, and a second coil winding. Both the first coil winding and the second coil winding are the foregoing coil winding, and the first coil winding and the second coil winding are respectively located on two sides of the insulation layer.

Optionally, a first part of coils of the first coil winding and a second part of coils of the second coil winding are both located on one side of the insulation layer, and a second part of coils of the first coil winding and a first part of coils of the second coil winding are both located on the other side of the insulation layer.

Optionally, the first part of coils of the first coil winding and the second part of coils of the second coil winding are located in a same planar coil and are not in contact with each other. That is, the first part of coils of the first coil winding and the second part of coils of the second coil winding may form a first planar coil winding. Although located on a same plane, the first part of coils of the first coil winding and the second part of coils of the second coil winding are independent of each other. Therefore, the first planar coil winding is discontinuous, or that is, disconnected.

Optionally, the second part of coils of the first coil winding and the first part of coils of the second coil winding are located in a same planar coil and are not in contact with each other. That is, the second part of coils of the first coil winding and the first part of coils of the second coil winding may form a second planar coil winding. Although located on a same plane, the second part of coils of the first coil winding and the first part of coils of the second coil winding are independent of each other. Therefore, the second planar coil winding is discontinuous, or that is, disconnected.

Optionally, the innermost turn of coil of the first coil winding is located on one side of the insulation layer, the innermost turn of coil of the second coil winding is located on the other side of the insulation layer, and an end portion of the innermost turn of coil of the second coil winding is electrically connected to an end portion of the innermost turn of coil of the first coil winding.

According to a third aspect, a wireless charging transmitting apparatus is provided. The apparatus includes a direct current/alternating current conversion circuit, a control unit, and the foregoing coil module.

An input end of the direct current/alternating current conversion circuit is connected to a direct current power source. Under control of the control unit, the direct current/alternating current conversion circuit converts a direct-current signal input by the direct current power source into an alternating-current signal, and transmits the alternating-current signal to the coil module such that the coil module transmits the alternating-current signal.

In this embodiment of this application, the wireless charging transmitting apparatus includes the coil module. A circulating current loss in the coil module is relatively small, and therefore wireless charging efficiency of the wireless charging transmitting apparatus can be improved.

Further, the apparatus further includes a matching circuit. The matching circuit is connected between the direct current/alternating current conversion circuit and the coil module, and is configured to resonate with the coil module.

In this embodiment of this application, the alternating-current signal output by the direct current/alternating current conversion circuit can be efficiently transmitted to the coil module using the matching circuit.

According to a fourth aspect, a wireless charging receiving apparatus is provided. The apparatus includes an alternating current/direct current conversion circuit, a control unit, a load, and the foregoing coil module.

The coil module is connected to an input end of the alternating current/direct current conversion circuit. The coil module receives an alternating-current signal, and transmits the alternating-current signal to the alternating current/direct current conversion circuit. Under control of the control unit, the alternating current/direct current conversion circuit converts the alternating-current signal into a direct-current signal, and outputs the direct-current signal to the load, to supply power to the load.

In this embodiment of this application, the wireless charging receiving apparatus includes the coil module. A circulating current loss in the coil module is relatively small, and therefore wireless charging efficiency of the wireless charging receiving apparatus can be improved.

Further, the apparatus further includes a matching circuit. The matching circuit is connected between the coil module and the alternating current/direct current conversion circuit, and is configured to resonate with the coil module.

In this embodiment of this application, the alternating-current signal output by the coil module can be efficiently transmitted to the alternating current/direct current conversion circuit using the matching circuit.

According to a fifth aspect, a wireless charging system is provided. The system includes the foregoing wireless charging transmitting apparatus, and includes the foregoing wireless charging receiving apparatus, and the wireless charging transmitting apparatus is configured to wirelessly charge the wireless charging receiving apparatus.

In this embodiment of this application, the wireless charging system includes the wireless charging transmitting apparatus and the wireless charging receiving apparatus. The wireless charging transmitting apparatus and the wireless charging receiving apparatus each include a coil module. A circulating current loss in the coil module is relatively small, and therefore wireless charging efficiency of the wireless charging system can be improved.

According to a sixth aspect, a terminal is provided. The terminal includes an alternating current/direct current conversion circuit, a charging control unit, a workload circuit, and the foregoing coil module, where the coil module is connected to an input end of the alternating current/direct current conversion circuit, and the coil module receives an alternating-current signal, and transmits the alternating-current signal to the alternating current/direct current conversion circuit, and under control of the charging control unit, the alternating current/direct current conversion circuit converts the alternating-current signal into a direct-current signal, and outputs the direct-current signal to the workload circuit.

In this embodiment of this application, the terminal includes the coil module. A circulating current loss in the coil module is relatively small, and therefore wireless charging efficiency of the terminal can be improved.

The technical solutions provided in this application can bring at least the following beneficial effects.

The coil winding includes the insulation layer, the first part of coils located on one side of the insulation layer, and the second part of coils located on the other side of the insulation layer. The first part of coils includes the first segment of conducting wire, and the second part of coils includes the second segment of conducting wire. The first segment of conducting wire is provided with N cutting openings, and the first segment of conducting wire is divided into N+1 first sub conducting wires by the N cutting openings provided thereon. The second segment of conducting wire is also provided with N cutting openings, and the second segment of conducting wire is also divided into N+1 second sub conducting wires by the N cutting openings provided thereon. Each cutting opening extends along an extension direction of a corresponding segment of conducting wire, and N is an integer greater than or equal to 1. The N+1 first sub conducting wires and the N+1 second sub conducting wires are electrically connected in a one-to-one manner, to form N+1 pairs of sub conducting wires. At least one crossover structure is formed in the N+1 pairs of sub conducting wires, and each pair of sub conducting wires includes one first sub conducting wire and one corresponding second sub conducting wire. In this case, when a magnetic field passes through the cutting openings between the N+1 pairs of sub conducting wires, in each of at least two pairs of sub conducting wires among the N+1 pairs of sub conducting wires, an induced current generated by one first sub conducting wire and an induced current generated by one corresponding second sub conducting wire are opposite in direction and therefore can at least partially cancel each other. This can effectively reduce the circulating current loss in the coil winding, thereby improving the wireless charging efficiency of the coil winding.

Figure 1:
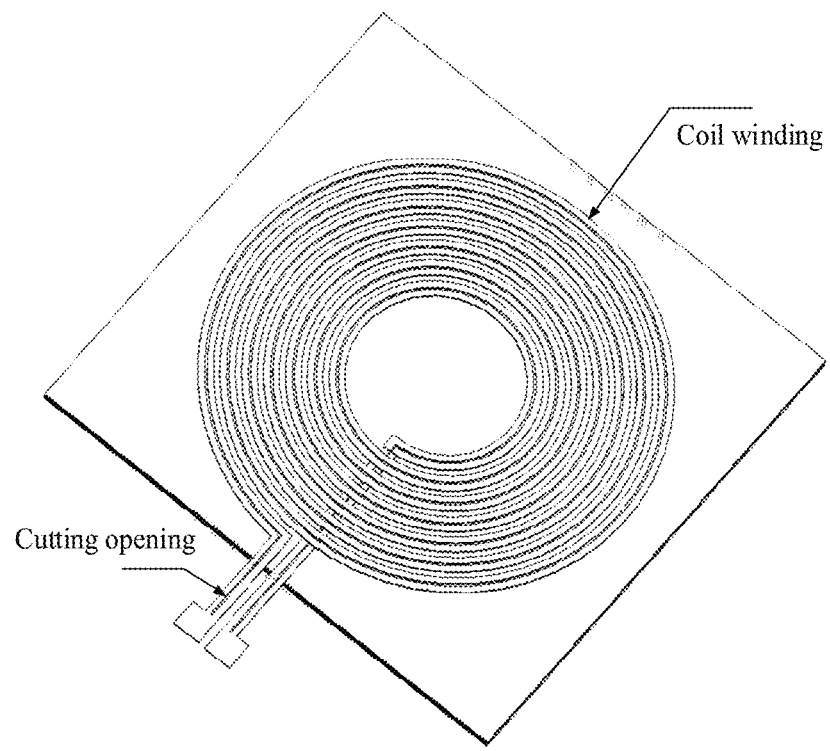
FIG. 1 is a schematic structural diagram of a wireless charging coil according to the related art.

Reference numerals: 1: first coil winding, 2: second coil winding, 3: magnetic conductive plate, D1: first conducting wire, D2: second conducting wire, L3: third connection portion, 01: first segment of conducting wire, 02: second segment of conducting wire, 03: third segment of conducting wire, 04: fourth segment of conducting wire, 05: fifth segment of conducting wire, 06: sixth segment of conducting wire, 07: seventh segment of conducting wire, 08: eighth segment of conducting wire, 09: ninth segment of conducting wire, 010: tenth segment of conducting wire, 11: first sub conducting wire, 22: second sub conducting wire, 33: third sub conducting wire, 44: fourth sub conducting wire, 55: fifth sub conducting wire, 66: sixth sub conducting wire, 77: seventh sub conducting wire, 88: eighth sub conducting wire, 99: ninth sub conducting wire, 100: tenth sub conducting wire, 171: direct current power source, 172: direct current/alternating current conversion circuit, 173: control unit, 174: coil module, 175: matching circuit, 211: alternating current/direct current conversion circuit, 212: control unit, 213: load, 214: coil module, 215: matching circuit, 251: wireless charging transmitting apparatus, 252: wireless charging receiving apparatus, 261: workload circuit, 262: alternating current/direct current conversion circuit, 263: charging control unit, 264: coil module, 265: matching circuit.

DESCRIPTION OF EMBODIMENTS

To make the objectives, technical solutions, and advantages of this application clearer, the following further describes implementations of this application in detail with reference to the accompanying drawings.

Figure 3:
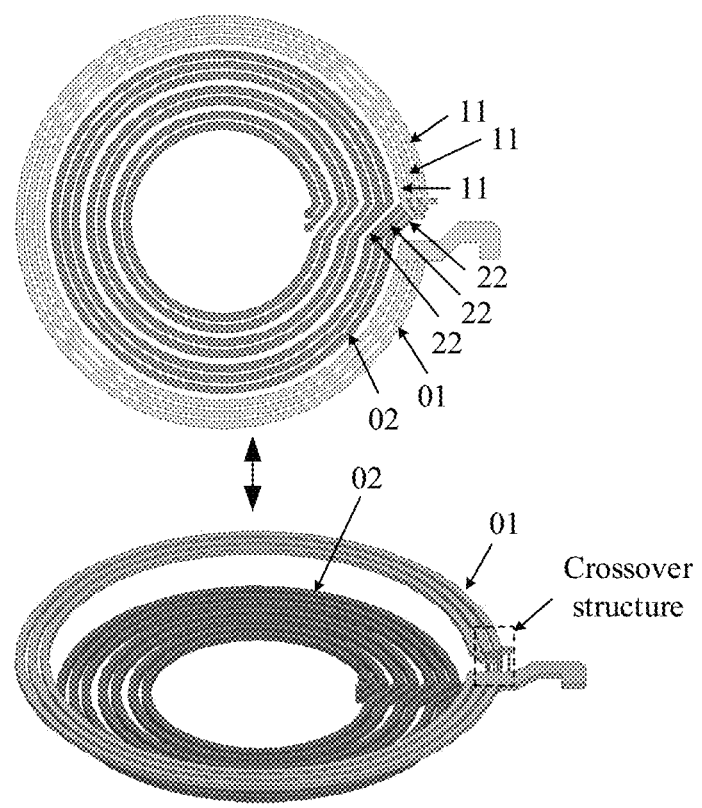
FIG. 3 is a schematic structural diagram of a first coil winding according to an embodiment of this application.

FIG. 3 is a schematic structural diagram of a coil winding according to an embodiment of this application. As shown in FIG. 3, the coil winding includes an insulation layer, a first part of coils located on one side of the insulation layer, and a second part of coils located on the other side of the insulation layer.

The first part of coils includes a first segment of conducting wire 01, the first segment of conducting wire 01 is provided with N cutting openings, and the first segment of conducting wire 01 is divided into N+1 first sub conducting wires 11 by the N cutting openings provided thereon. The second part of coils includes a second segment of conducting wire 02, the second segment of conducting wire 02 is also provided with N cutting openings, and the second segment of conducting wire 02 is also divided into N+1 second sub conducting wires 22 by the N cutting openings provided thereon. N is an integer greater than or equal to 1. It should be noted that each cutting opening provided on the first segment of conducting wire 01 extends along an extension direction of the first segment of conducting wire 01. Each cutting opening provided on the second segment of conducting wire 02 extends along an extension direction of the second segment of conducting wire 02. In this application, the N+1 first sub conducting wires 11 and the N+1 second sub conducting wires 22 are electrically connected in a one-to-one manner, to form N+1 pairs of sub conducting wires. At least one crossover structure is formed in the N+1 pairs of sub conducting wires, and each pair of sub conducting wires includes one first sub conducting wire 11 and one corresponding second sub conducting wire 22.

It should be noted that the insulation layer is an insulating material layer between the first part of coils and the second part of coils, and is configured to isolate the first part of coils and the second part of coils, to keep other parts than mutually connecting parts of the first part of coils and the second part of coils insulated. In this case, the first part of coils and the second part of coils are located on different planes. Therefore, in this embodiment of this application, the coil winding is not a planar coil winding.

In addition, the coil winding includes a plurality of turns of coils. The coil winding is a conductive pattern formed by winding a conductor. The conductive pattern may be circular shaped, oval ring shaped, or the like. Any one of the plurality of turns of coils of the coil winding is formed by evenly winding the conductor by 360 degrees. Optionally, every two adjacent turns of coils of the plurality of turns of coils of the coil winding may be electrically connected. That is, the plurality of turns of coils of the coil winding are formed by continuous winding, and particularly, every two adjacent turns of coils are formed by continuous winding. It should be noted that "a plurality of turns" in the expression "the coil winding includes a plurality of turns of coils" is usually far greater than two turns.

Furthermore, the coil winding may be disposed on a circuit board such as a printed circuit board (PCB) or a flexible printed circuit (FPC). Alternatively, the plurality of turns of coils of the coil winding may be formed using an etching method, an electroplating additive method, a die-cutting process, a laser process, or the like.

It should be noted that the first part of coils or the second part of coils may be continuous or may be discontinuous. For example, the coil winding has 10 turns of coils in total from the outermost turn to the innermost turn. In a case, the three outermost turns of coils of the 10 turns of coils belong to the first part of coils, and the other seven turns of coils belong to the second part of coils. In this case, it can be considered that both the first part of coils and the second part of coils are continuous. In another case, the three outermost turns of coils and the two innermost turns of coils of the 10 turns of coils belong to the first part of coils, and the other five turns of coils belong to the second part of coils. In this case, the first part of coils is discontinuous and the second part of coils is continuous.

In addition, the first segment of conducting wire 01 and the second segment of conducting wire 02 are each configured to indicate a segment of conducting wire located in the coil winding, and the so-called segment of conducting wire may be located in a turn of coil of the coil winding. A length of the first segment of conducting wire 01 is the same as or substantially the same as a length of a longest cutting opening provided on the first segment of conducting wire 01. Optionally, all the cutting openings provided on the first segment of conducting wire 01 are of a same length, or at least two of all the cutting openings provided on the first segment of conducting wire 01 are of different lengths. A length of the second segment of conducting wire 02 is the same as or substantially the same as a length of a longest cutting opening provided on the second segment of conducting wire 02. Optionally, all the cutting openings provided on the second segment of conducting wire 02 are of a same length, or at least two of all the cutting openings provided on the second segment of conducting wire 02 are of different lengths.

Furthermore, a cutting opening may also be referred to as a gap or an interval. A segment of conducting wire corresponding to each cutting opening is a segment of conducting wire cut by the cutting opening. Each cutting opening extending along an extension direction of the corresponding segment of conducting wire means that each cutting opening extends along an extension direction of the segment of conducting wire cut by the cutting opening. That is, an extension direction of each cutting opening is consistent with the extension direction of the segment of conducting wire corresponding to the cutting opening. For example, each of the N cutting openings provided on the first segment of conducting wire extends along the extension direction of the first segment of conducting wire. Further, an extension direction of each of the N cutting openings provided on the first segment of conducting wire is consistent with the extension direction of the first segment of conducting wire. Each of the N cutting openings provided on the second segment of conducting wire extends along the extension direction of the second segment of conducting wire. Further, an extension direction of each of the N cutting openings provided on the second segment of conducting wire is consistent with the extension direction of the second segment of conducting wire.

It should be noted that a cutting opening in the coil winding may be formed by cutting, chemical corrosion, or the like. For example, cutting, chemical corrosion, or the like may be performed on the first segment of conducting wire 01, to obtain N cutting openings. The N cutting openings separate the first segment of conducting wire 01 into the N+1 first sub conducting wires 11. In this case, there is a cutting opening between every two adjacent first sub conducting wires 11 of the N+1 first sub conducting wires 11. For another example, cutting, chemical corrosion, or the like may be performed on the second segment of conducting wire 02, to obtain N cutting openings. The N cutting openings separate the second segment of conducting wire 02 into the N+1 second sub conducting wires 22. In this case, there is a cutting opening between every two adjacent second sub conducting wires 22 of the N+1 second sub conducting wires 22. It should be noted that an extension direction of each first sub conducting wire 11 is consistent with (or the same as) the extension direction of the first segment of conducting wire 01, and an extension direction of each second sub conducting wire 22 is consistent with (or the same as) the extension direction of the second segment of conducting wire 02.

In addition, a second sub conducting wire 22 corresponding to each first sub conducting wire 11 is a second sub conducting wire 22 electrically connected to the first sub conducting wire 11. Each first sub conducting wire 11 and the corresponding second sub conducting wire 22 are a pair of sub conducting wires. Then, the N+1 first sub conducting wires 11 and the N+1 second sub conducting wires 22 may form the N+1 pairs of sub conducting wires.

In this application, at least one crossover structure is formed in the N+1 pairs of sub conducting wires.

Further, alternatively, at least two crossover structures may be formed in the N+1 pairs of sub conducting wires.

Optionally, a crossover structure is formed between one pair of sub conducting wires and at least one other pair of sub conducting wires among the N+1 pairs of sub conducting wires.

Optionally, a crossover structure is formed between each pair of sub conducting wires and at least one other pair of sub conducting wires among the N+1 pairs of sub conducting wires.

Optionally, a crossover structure is formed between each pair of sub conducting wires and each pair of the other pairs of sub conducting wires among the N+1 pairs of sub conducting wires.

The following explains and describes the crossover structure mentioned in this embodiment of this application.

Figure 2:
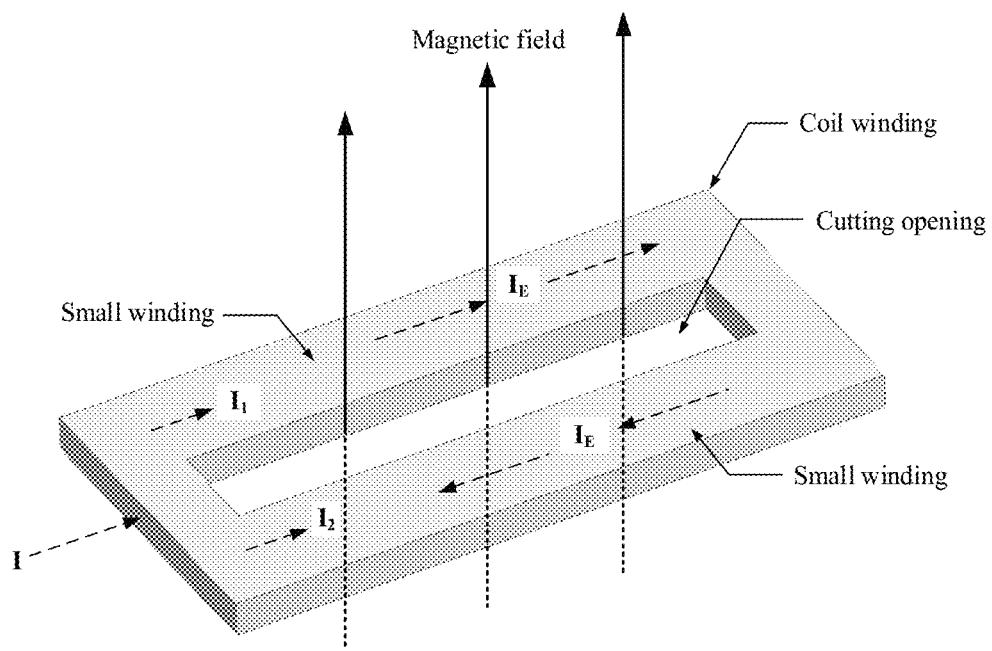
FIG. 2 is a schematic diagram of an induced current in a small winding according to the related art.

FIG. 2 shows a structural state of a coil winding when there is no crossover structure. In this case, in a small winding, a plurality of sub conducting wires in a left-half part and a plurality of sub conducting wires in a right-half part are connected in a one-to-one manner. Further, each sub conducting wire in the left-half part and a corresponding sub conducting wire in the right-half part are actually continuous (or uninterrupted). That is, they actually belong to a same sub conducting wire and are just different parts of the same sub conducting wire. In this case, the plurality of sub conducting wires in the coil winding do not cross each other.

Figure 4:
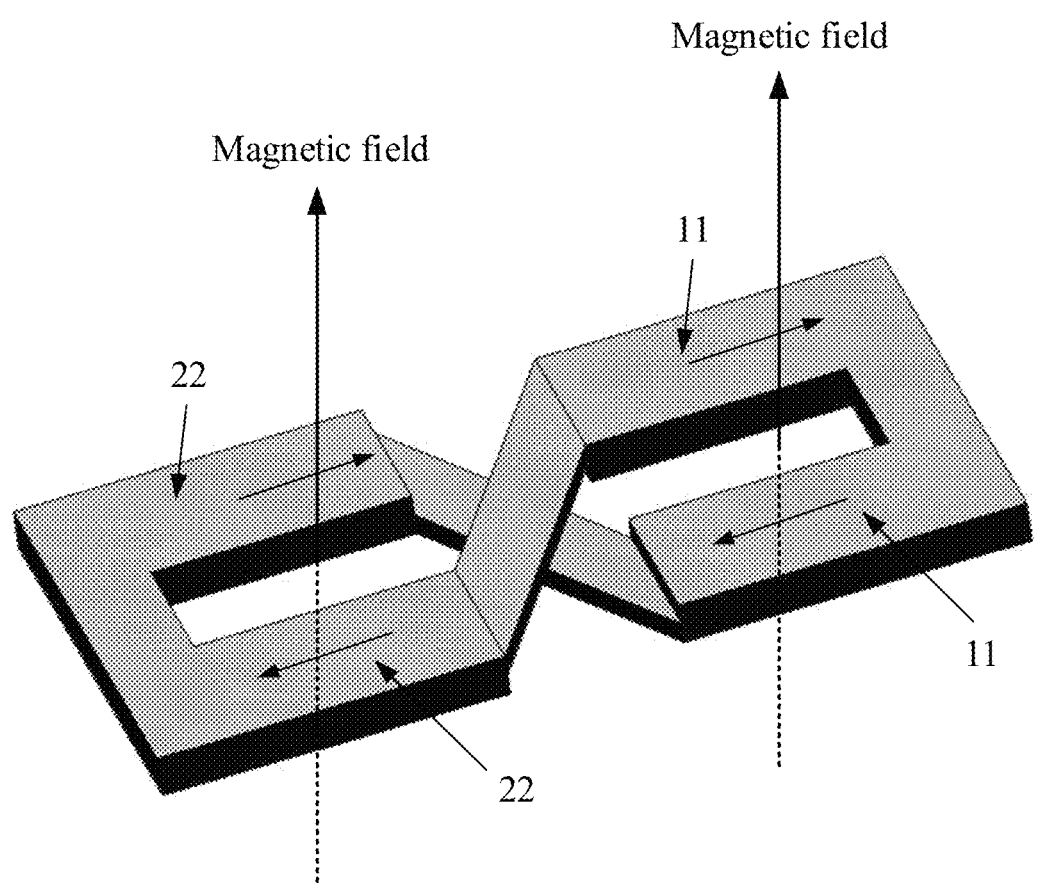
FIG. 4 is a schematic diagram of a crossover structure according to an embodiment of this application.

FIG. 3 shows a structural state of the coil winding according to this embodiment of this application. The first segment of conducting wire 01 and the second segment of conducting wire 02 are disconnected (or discontinuous), and the first segment of conducting wire 01 and the second segment of conducting wire 02 are respectively located on two sides of the insulation layer. As shown in FIG. 4, although the N+1 first sub conducting wires 11 of the first segment of conducting wire 01 and the N+1 second sub conducting wires 22 of the second segment of conducting wire 02 are connected in a one-to-one manner, for at least two pairs of sub conducting wires among the N+1 pairs of sub conducting wires formed by connecting the N+1 first sub conducting wires 11 and the N+1 second sub conducting wires 22, one first sub conducting wire 11 and one second sub conducting wire 22 included in each pair of sub conducting wires do not belong to a same sub conducting wire, but are different sub conducting wires. In addition, projections of the at least two pairs of sub conducting wires on a plane on which the insulation layer is located are crossed.

It should be noted that the N+1 first sub conducting wires 11 are mutually separated at one end, and this end of each of the N+1 first sub conducting wires 11 is electrically connected to one end of each of the N+1 second sub conducting wires 22 in a one-to-one manner. The other ends of the N+1 first sub conducting wires 11 may be electrically connected using other parts than the first segment of conducting wire 01 and the second segment of conducting wire 02 of the coil winding, or may be electrically connected using a conducting wire connected between the coil winding and an outlet end or an inlet end of a coil module on which the coil winding is located, may be electrically connected to a connection terminal of an external circuit using the coil module, or the like.

In addition, the N+1 second sub conducting wires 22 are mutually separated at one end, and this end of each of the N+1 second sub conducting wires 22 is electrically connected to one end of each of the N+1 first sub conducting wires 11 in a one-to-one manner. The other ends of the N+1 second sub conducting wires 22 may be electrically connected using other parts than the first segment of conducting wire 01 and the second segment of conducting wire 02 of the coil winding, or may be electrically connected using a conducting wire connected between the coil winding and an outlet end or an inlet end of a coil module on which the coil winding is located, may be electrically connected to a connection terminal of an external circuit using the coil module, or the like.

In this embodiment of this application, for any one of the N+1 first sub conducting wires 11, there is one unique second sub conducting wire 22 in the N+1 second sub conducting wires 22 corresponding to the first sub conducting wire 11. That is, the N+1 first sub conducting wires 11 and the N+1 second sub conducting wires 22 are electrically connected in a one-to-one manner.

In a possible implementation, each of the N+1 pairs of sub conducting wires may be electrically connected using at least one first through hole. For any pair of sub conducting wires, the at least one first through hole may penetrate through one first sub conducting wire 11 and one second sub conducting wire 22 in this pair of sub conducting wires, and the first sub conducting wire 11 and the second sub conducting wire 22 are electrically connected using the at least one first through hole.

In another possible implementation, each of the N+1 pairs of sub conducting wires may be electrically connected using a technique such as a pulse-heated reflow soldering (hot bar) technique or a laser welding technique.

In still another possible implementation, the coil winding may further include N+1 first connection portions. The N+1 first connection portions are not electrically connected. Each of the N+1 pairs of sub conducting wires may be electrically connected using one unique first connection portion. In this implementation, not only the N+1 first sub conducting wires 11 are in a one-to-one correspondence with the N+1 second sub conducting wires 22, and the N+1 first sub conducting wires 11 (or the N+1 second sub conducting wires 22) are also in a one-to-one correspondence with the N+1 first connection portions. In short, each first sub conducting wire 11 uniquely corresponds to one second sub conducting wire 22, and uniquely corresponds to one first connection portion.

It should be noted that regardless of whether the electrical connection is implemented using the at least one first through hole, using a technique such as the pulse-heated reflow soldering technique or the laser welding technique, or using the first connection portion, these are just specific means for implementing the electrical connection, and any one of these three electrical connection means may be selected for each pair of sub conducting wires. Therefore, an electrical connection means of the N+1 pairs of sub conducting wires may include only one of these three electrical connection means, may include two of these three electrical connection means, or naturally may include all of these three electrical connection means.

It should be noted that a current flowing into the coil winding from an external circuit or a current generated by the coil winding may first flow into the N+1 first sub conducting wires 11, then flow into the N+1 second sub conducting wires 22 from the N+1 first sub conducting wires 11, and finally flow out from the coil winding. Alternatively, a current flowing into the coil winding from an external circuit or a current generated by the coil winding may first flow into the N+1 second sub conducting wires 22, then flow into the N+1 first sub conducting wires 11 from the N+1 second sub conducting wires 22, and finally flow out from the coil winding.

It should be noted that a series crossover structure is formed between the first segment of conducting wire 01 and the second segment of conducting wire 02 of the coil winding which have the same quantity of cutting openings. That is, at least one crossover structure is formed in the N+1 pairs of sub conducting wires. In this case, when a magnetic field passes through the cutting openings between the N+1 pairs of sub conducting wires, in each of at least two pairs of sub conducting wires among the N+1 pairs of sub conducting wires, an induced current generated by one first sub conducting wire 11 and an induced current generated by one corresponding second sub conducting wire 22 are opposite in direction and therefore can at least partially cancel each other. This can effectively reduce a circulating current loss in the coil winding, thereby improving wireless charging efficiency of the coil winding.

A projection of the first segment of conducting wire 01 on a plane on which the insulation layer is located and a projection of the second segment of conducting wire 02 on the plane on which the insulation layer is located form a continuous line pattern. A length of the line pattern is greater than a length of a longer one of the first segment of conducting wire 01 and the second segment of conducting wire 02, and is less than a sum of a length of the first segment of conducting wire 01 and a length of the second segment of conducting wire 02.

It should be noted that, assuming that the projection of the first segment of conducting wire 01 on the plane on which the insulation layer is located is a first projected line and the projection of the second segment of conducting wire 02 on the plane on which the insulation layer is located is a second projected line, the first projected line and the second projected line are adjacent to each other and have a joint portion. A region that is of the first segment of conducting wire 01 and that is corresponding to the joint portion is a first connection region, and a region that is of the second segment of conducting wire 02 and that is corresponding to the joint portion is a second connection region. The first connection region and the second connection region are electrically connected such that the first segment of conducting wire 01 and the second segment of conducting wire 02 are electrically connected.

In addition, the first projected line and the second projected line form a long continuous line pattern. The line pattern has no difference with a projection, of a segment of long conducting wire located in a planar coil winding, on the plane on which the insulation layer is located. A plane on which the planar coil winding is located is substantially parallel to the plane on which the insulation layer is located, and a length of the segment of long conducting wire is approximately equal to the sum of the length of the first segment of conducting wire and the length of the second segment of conducting wire.

Figure 5:
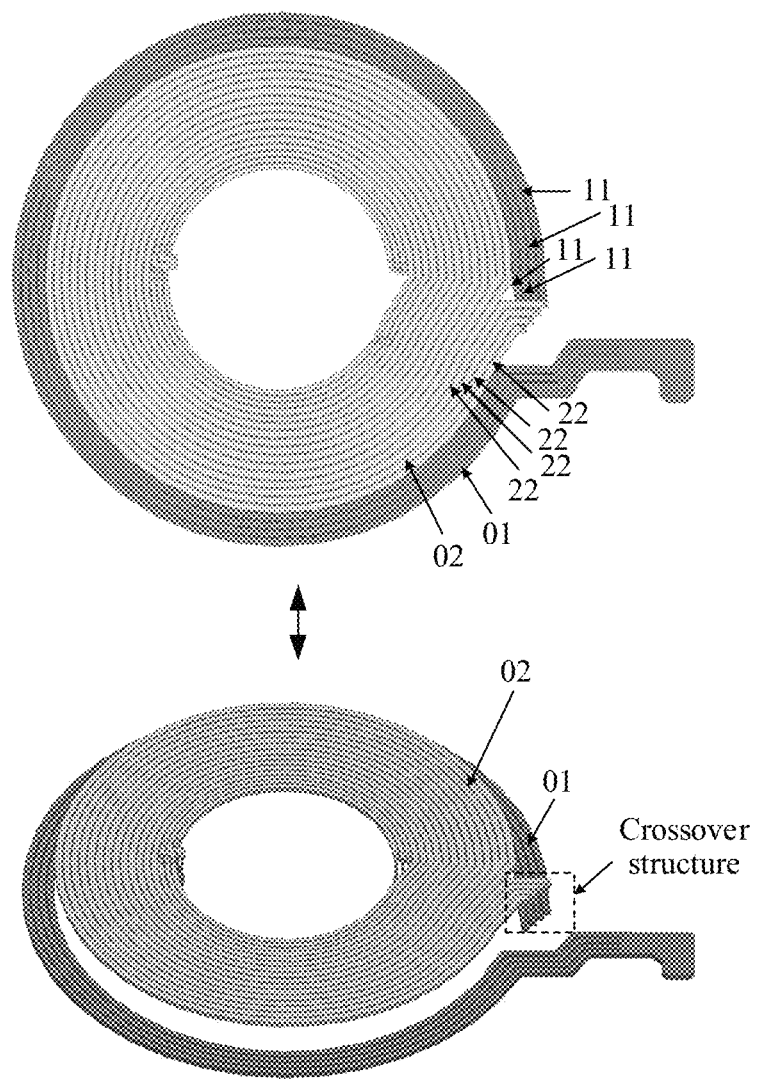
FIG. 5 is a schematic structural diagram of a second coil winding according to an embodiment of this application.

Optionally, referring to FIG. 5, N is an integer greater than or equal to 2. Then, the first segment of conducting wire 01 is divided into at least three first sub conducting wires 11, and the second segment of conducting wire 02 is also divided into at least three second sub conducting wires 22.

Optionally, an induced current generated by a magnetic field passing through the N cutting openings in the first segment of conducting wire 01 and an induced current generated by a magnetic field passing through the N cutting openings in the second segment of conducting wire 02 are opposite in direction and equal in size.

It can be understood that based on a design error and a technique implementation capability, "being equal in size" herein should be substantially equal in size or approximately equal in size. For example, when a difference between the sizes of the two induced currents is less than or equal to 10%, it can be considered that the two induced currents are equal in size. That is, "being equal in size" should be interpreted according to conventional understanding of persons in the art and is not absolute equality.

In addition, a strength of the magnetic field passing through the N cutting openings in the first segment of conducting wire 01 and a strength of the magnetic field passing through the N cutting openings in the second segment of conducting wire 02 are not completely equal in size because of uneven magnetic field distribution. To make the induced currents cancel each other as much as possible, an area of the N cutting openings in the first segment of conducting wire 01 and an area of the N cutting openings in the second segment of conducting wire 02 can be designed, to adjust the induced currents generated by the magnetic fields thereof.

Further, to make the induced current generated by the magnetic field passing through the N cutting openings in the first segment of conducting wire 01 and the induced current generated by the magnetic field passing through the N cutting openings in the second segment of conducting wire 02 opposite in direction and equal in size, the first segment of conducting wire 01 can be designed to be adjacent to the second segment of conducting wire 02, the first segment of conducting wire 01 is g continuous turns of coils in the plurality of turns of coils of the coil winding, and the second segment of conducting wire 02 is g continuous turns of coils other than the first segment of conducting wire 01 in the plurality of turns of coils of the coil winding, where g is a positive number.

For example, as shown in FIG. 3, the outermost turn of coil and the second outermost turn of coil of the coil winding each have two cutting openings. That is, the two outermost turns of coils of the coil winding have the same quantity of cutting openings. Then, a series crossover structure may be constructed at a junction of the outermost turn of coil and the second outermost turn of coil of the coil winding. That is, the series crossover structure is constructed at the junction of the two turns of coils. In this case, the first segment of conducting wire 01 is the outermost coil of the coil winding, and the second segment of conducting wire 02 is the second outermost turn of coil of the coil winding.

Optionally, in the plurality of turns of coils included in the coil winding, a width of at least one turn of coil is greater than that of at least another turn of coil. The coil with a larger width has A cutting openings, and the A cutting openings divide the coil with a larger width into A+1 sub conducting wires. The coil with a smaller width has B cutting openings, and the B cutting openings divide the coil with a smaller width into B+1 sub conducting wires. Each of the cutting openings extends along an extension direction of a corresponding coil. A and B are both integers greater than or equal to 1, and A is greater than B. In short, coils of a same width have a same quantity of cutting openings, and a coil with a larger width has a larger quantity of cutting openings.

For example, as shown in FIG. 3, the two outermost turns of coils of the coil winding are equal in width. The two turns of coils each have two cutting openings, and the two cutting openings divide the two turns of coils into three sub conducting wires. In the coil winding, a width of the outermost turn of coil is greater than a width of the innermost turn of coil. The innermost turn of coil of the coil winding has one cutting opening, and the one cutting opening divides the innermost turn of coil of the coil winding into two sub conducting wires.

Optionally, a coil with a larger width is located on an outer side of a coil with a smaller width. Optionally, widths of the plurality of turns of coils of the coil winding gradually decrease from the outermost turn of coil to the innermost turn of coil.

Optionally, for two adjacent turns of coils of the coil winding that have different quantities of cutting openings, a cutting opening provided on one of the two turns of coils is connected to one of cutting openings provided on the other turn of coil, or none of cutting openings provided on one of the two turns of coils are connected to cutting openings provided on the other turn of coil.

As shown in FIG. 3, for the second outermost turn of coil and the second innermost turn of coil of the coil winding, the second outermost turn of coil is provided with two cutting openings, and the second innermost turn of coil is provided with one cutting opening. The one cutting opening provided on the second innermost turn of coil is connected to one of the two cutting openings provided on the second outermost turn of coil.

Figure 6:
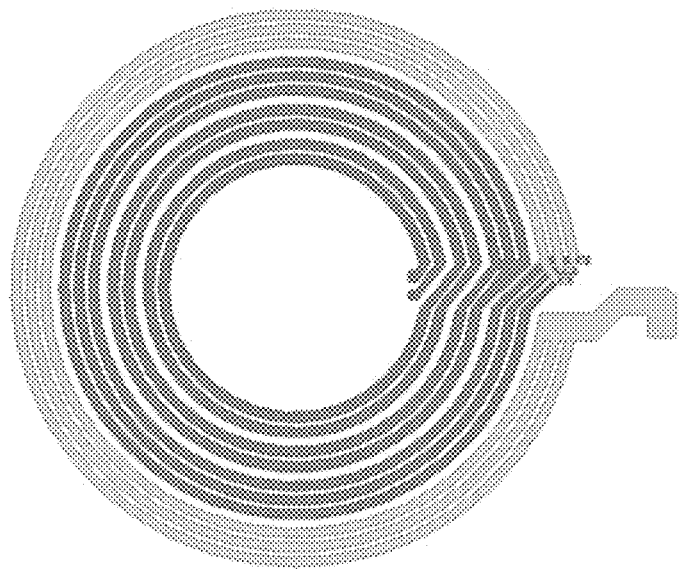
FIG. 6 is a schematic structural diagram of a third coil winding according to an embodiment of this application.

However, as shown in FIG. 6, for the second outermost turn of coil and the second innermost turn of coil of the coil winding, the second outermost turn of coil is provided with two cutting openings, and the second innermost turn of coil is provided with one cutting opening. However, the one cutting opening provided on the second innermost turn of coil is connected to neither of the two cutting openings provided on the second outermost turn of coil.

Figure 7:
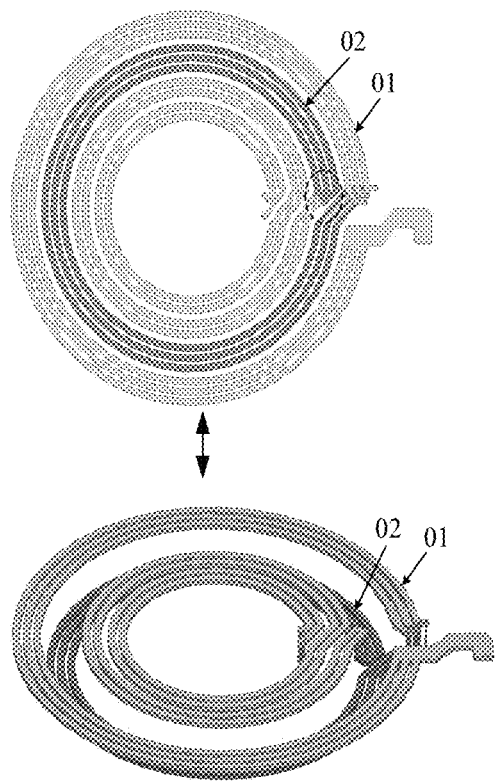
FIG. 7 is a schematic structural diagram of a fourth coil winding according to an embodiment of this application.

Optionally, referring to FIG. 7, for two adjacent turns of coils of the coil winding that have different quantities of cutting openings, one turn of coil is located on one side of the insulation layer, and the other turn of coil is located on the other side of the insulation layer. That is, the two turns of coils are located on different planes.

In this case, in a possible implementation, the two turns of coils may be electrically connected using at least one second through hole. The at least one second through hole penetrates through the two turns of coils, and the two turns of coils are electrically connected using the at least one second through hole. In another possible implementation, alternatively, the two turns of coils may be electrically connected using the hot bar technique, the laser welding technique, or the like. In still another possible implementation, the coil winding may further include a second connection portion. The second connection portion is located between the two turns of coils, and the two turns of coils are electrically connected using the second connection portion.

For example, as shown in FIG. 7, the second outermost turn of coil and the second innermost turn of coil of the coil winding are adjacent to each other. The second outermost turn of coil is provided with two cutting openings, and the second innermost turn of coil is provided with one cutting opening. The second outermost turn of coil is located on one side of the insulation layer, and the second innermost turn of coil is located on the other side of the insulation layer.

Figure 8:
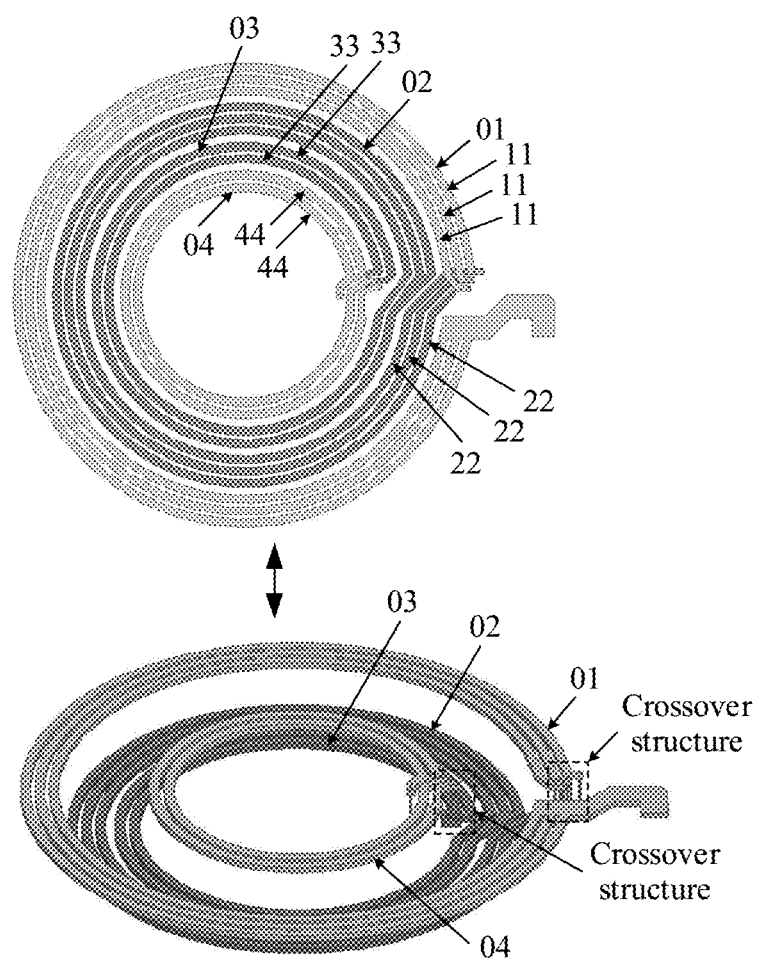
FIG. 8 is a schematic structural diagram of a fifth coil winding according to an embodiment of this application.

Further, referring to FIG. 8, the first part of coils includes a third segment of conducting wire 03, and the second part of coils includes a fourth segment of conducting wire 04. The third segment of conducting wire 03 is provided with M cutting openings, and the third segment of conducting wire 03 is divided into M+1 third sub conducting wires 33 by the M cutting openings provided thereon. The fourth segment of conducting wire 04 is also provided with M cutting openings, and the fourth segment of conducting wire 04 is also divided into M+1 fourth sub conducting wires 44 by the M cutting openings provided thereon. Each cutting opening extends along an extension direction of a corresponding segment of conducting wire, M is an integer greater than or equal to 1, and M is different from N. The M+1 third sub conducting wires 33 and the M+1 fourth sub conducting wires 44 are electrically connected in a one-to-one manner, to form M+1 pairs of sub conducting wires. At least one crossover structure is formed in the M+1 pairs of sub conducting wires. Each pair of sub conducting wires includes one third sub conducting wire 33 and one fourth sub conducting wire 44.

It should be noted that a series crossover structure formed between the third segment of conducting wire 03 and the fourth segment of conducting wire 04 is similar to the series crossover structure formed between the first segment of conducting wire 01 and the second segment of conducting wire 02. Details are not described again in this embodiment of this application.

It should be noted that the coil winding may not only include the first segment of conducting wire 01 and the second segment of conducting wire 02 that are provided with the same quantity of cutting openings, but may also include the third segment of conducting wire 03 and the fourth segment of conducting wire 04 that are provided with the same quantity of cutting openings. The quantity of cutting openings provided on the first segment of conducting wire 01 is different from the quantity of cutting openings provided on the third segment of conducting wire 03. A series crossover structure is formed between the third segment of conducting wire 03 and the fourth segment of conducting wire 04 in the coil winding that are provided with the same quantity of cutting openings. That is, at least one crossover structure is formed in the M+1 pairs of sub conducting wires. In this case, when a magnetic field passes through the cutting openings between the M+1 pairs of sub conducting wires, in each of at least two pairs of sub conducting wires among the M+1 pairs of sub conducting wires, an induced current generated by one third sub conducting wire 33 and an induced current generated by one corresponding second sub conducting wire 44 are opposite in direction and therefore can at least partially cancel each other. This can effectively reduce the circulating current loss in the coil winding, thereby improving the wireless charging efficiency of the coil winding.

In an embodiment of this application, a coil winding includes an insulation layer, a first part of coils located on one side of the insulation layer, and a second part of coils located on the other side of the insulation layer. The first part of coils includes a first segment of conducting wire 01, and the second part of coils includes a second segment of conducting wire 02. The first segment of conducting wire 01 is provided with N cutting openings, and the first segment of conducting wire 01 is divided into N+1 first sub conducting wires 11 by the N cutting openings provided thereon. The second segment of conducting wire 02 is also provided with N cutting openings, and the second segment of conducting wire 02 is also divided into N+1 second sub conducting wires 22 by the N cutting openings provided thereon. Each cutting opening extends along an extension direction of a corresponding segment of conducting wire, and N is an integer greater than or equal to 1. The N+1 first sub conducting wires 11 and the N+1 second sub conducting wires 22 are electrically connected in a one-to-one manner, to form N+1 pairs of sub conducting wires. At least one crossover structure is formed in the N+1 pairs of sub conducting wires, and each pair of sub conducting wires includes one first sub conducting wire 11 and one corresponding second sub conducting wire 22. In this case, when a magnetic field passes through the cutting openings between the N+1 pairs of sub conducting wires, in each of at least two pairs of sub conducting wires among the N+1 pairs of sub conducting wires, an induced current generated by one first sub conducting wire 11 and an induced current generated by one corresponding second sub conducting wire 22 are opposite in direction and therefore can at least partially cancel each other. This can effectively reduce a circulating current loss in the coil winding, thereby improving wireless charging efficiency of the coil winding.

An embodiment of this application further provides a coil module. The following describes the coil module.

In a first possible implementation, the coil module includes the coil winding shown in any one of FIG. 1 to FIG. 8.

Optionally, the coil module may further include an inlet end and an outlet end that are connected to an external circuit. The external circuit may supply electric power to the coil winding using the inlet end and the outlet end. Alternatively, the coil winding may output electric power to the external circuit using the inlet end and the outlet end.

In this case, the coil module may include a first conducting wire and a second conducting wire. One end of the first conducting wire is a first end of the coil module, and the other end of the first conducting wire is connected to an end portion of the innermost turn of coil of the coil winding. A first end of the second conducting wire is a second end of the coil module, and the other end of the second conducting wire is connected to an end portion of the outermost turn of coil of the coil winding. One of the first end of the coil module and the second end of the coil module is the outlet end, and the other one is the inlet end.

Optionally, the coil module may further include a magnetic conductive plate. The coil winding is located on the magnetic conductive plate and is insulated from the magnetic conductive plate.

It should be noted that when the coil module is placed normally, the magnetic conductive plate may be located beneath the coil winding. The magnetic conductive plate has a magnetic conductivity effect. This can improve an inductance value of the coil winding, and also prevent a magnetic field from leaking to space beneath the magnetic conductive plate, thereby exerting a desirable shielding effect on the space beneath the magnetic conductive plate. The magnetic conductive plate may be made of one or more magnetic materials such as a ferrite, an amorphous solid, a nanocrystal, or metal powder. This embodiment of this application sets no limitation thereto.

In a second possible implementation, referring to FIG. 9 to FIG. 16, the coil module may include an insulation layer, a first coil winding 1, and a second coil winding 2. Both the first coil winding 1 and the second coil winding 2 are the coil winding shown in FIG. 1 to FIG. 8. The first coil winding 1 and the second coil winding 2 are respectively located on two sides of the insulation layer.

Optionally, a first part of coils 01 of the first coil winding 1 and a second part of coils 02 of the second coil winding 2 are both located on one side of the insulation layer, and a second part of coils 02 of the first coil winding 1 and a first part of coils 01 of the second coil winding 2 are both located on the other side of the insulation layer.

For example, the first part of coils 01 of the first coil winding 1 and the second part of coils 02 of the second coil winding 2 may be located in a same planar coil and are not in contact with each other. That is, the first part of coils 01 of the first coil winding 1 and the second part of coils 02 of the second coil winding 2 may form a first planar coil winding. Although located on a same plane, the first part of coils 01 of the first coil winding 1 and the second part of coils 02 of the second coil winding 2 are independent of each other. Therefore, the first planar coil winding is discontinuous, or disconnected.

For another example, the second part of coils 02 of the first coil winding 1 and the first part of coils 01 of the second coil winding 2 may be located in a same planar coil and are not in contact with each other. That is, the second part of coils 02 of the first coil winding 1 and the first part of coils 01 of the second coil winding 2 may form a first planar coil winding. Although located on a same plane, the second part of coils 02 of the first coil winding 1 and the first part of coils 01 of the second coil winding 2 are independent of each other. Therefore, the second planar coil winding is discontinuous, or disconnected.

The following describes various possible connection structures between the first coil winding 1 and the second coil winding 2. A connection structure between the first coil winding 1 and the second coil winding 2 may include the following several possible structures.

Figure 9:
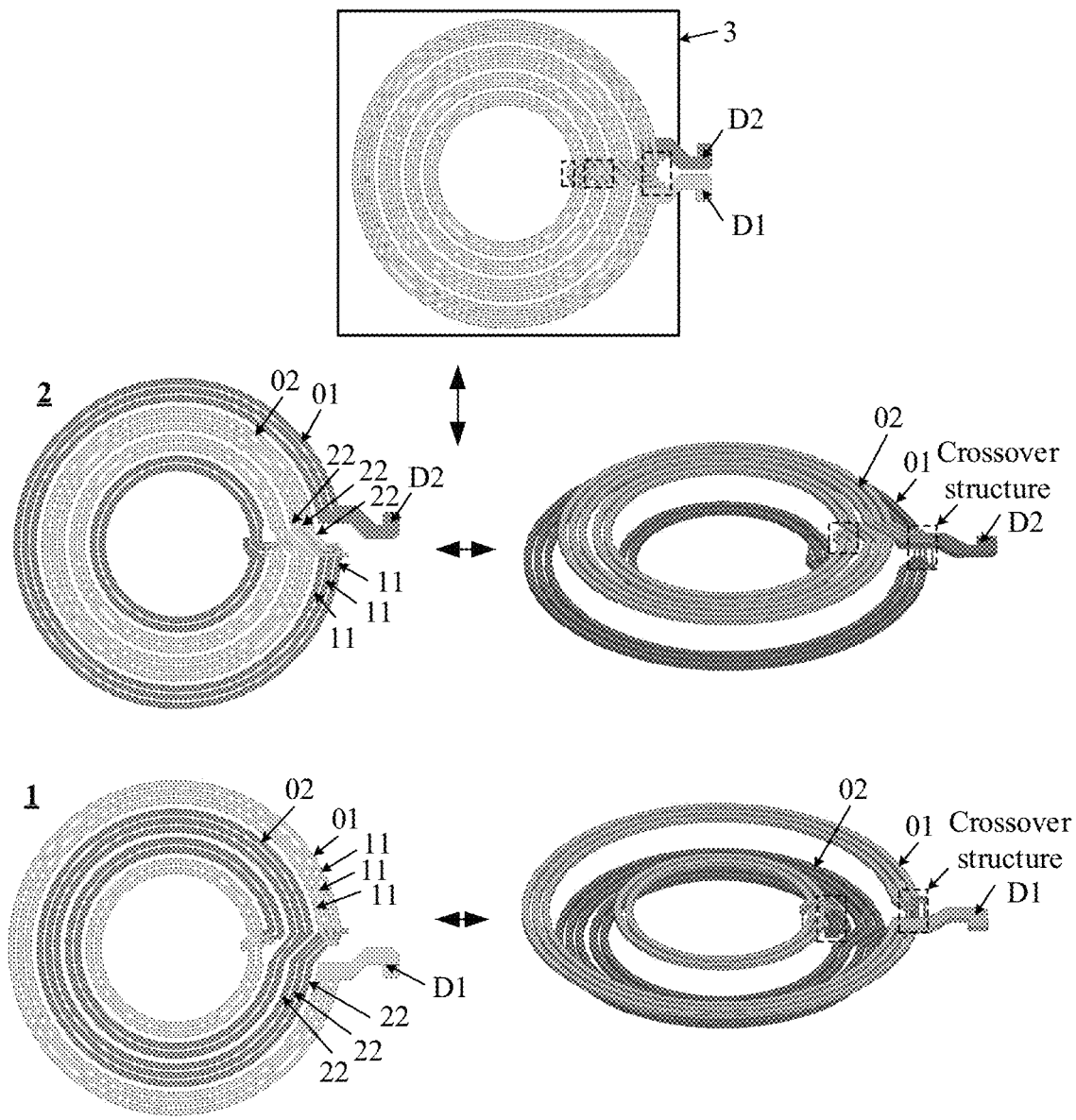
FIG. 9 is a schematic structural diagram of a first coil module according to an embodiment of this application.
Figure 10:
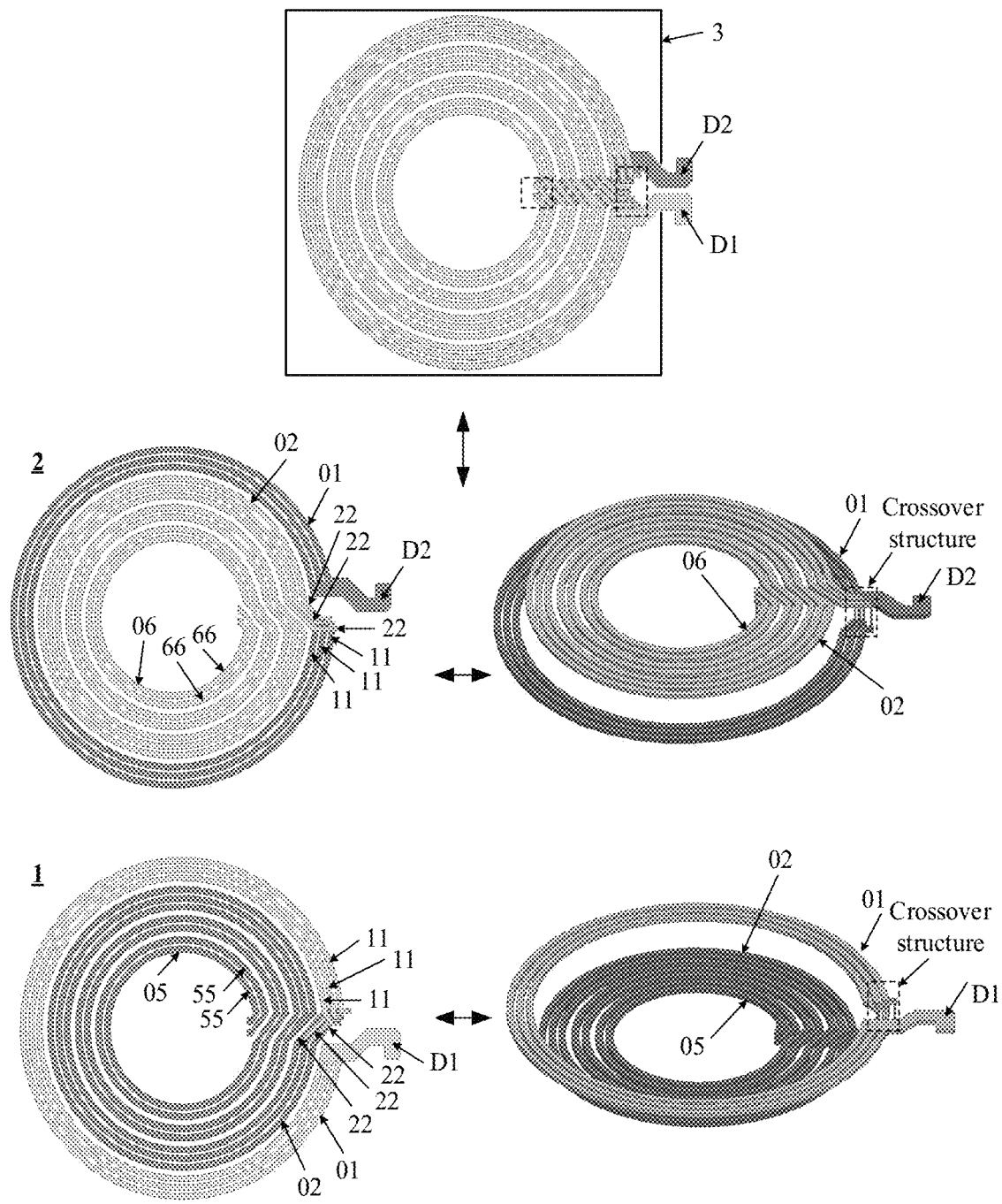
FIG. 10 is a schematic structural diagram of a second coil module according to an embodiment of this application.
Figure 11:
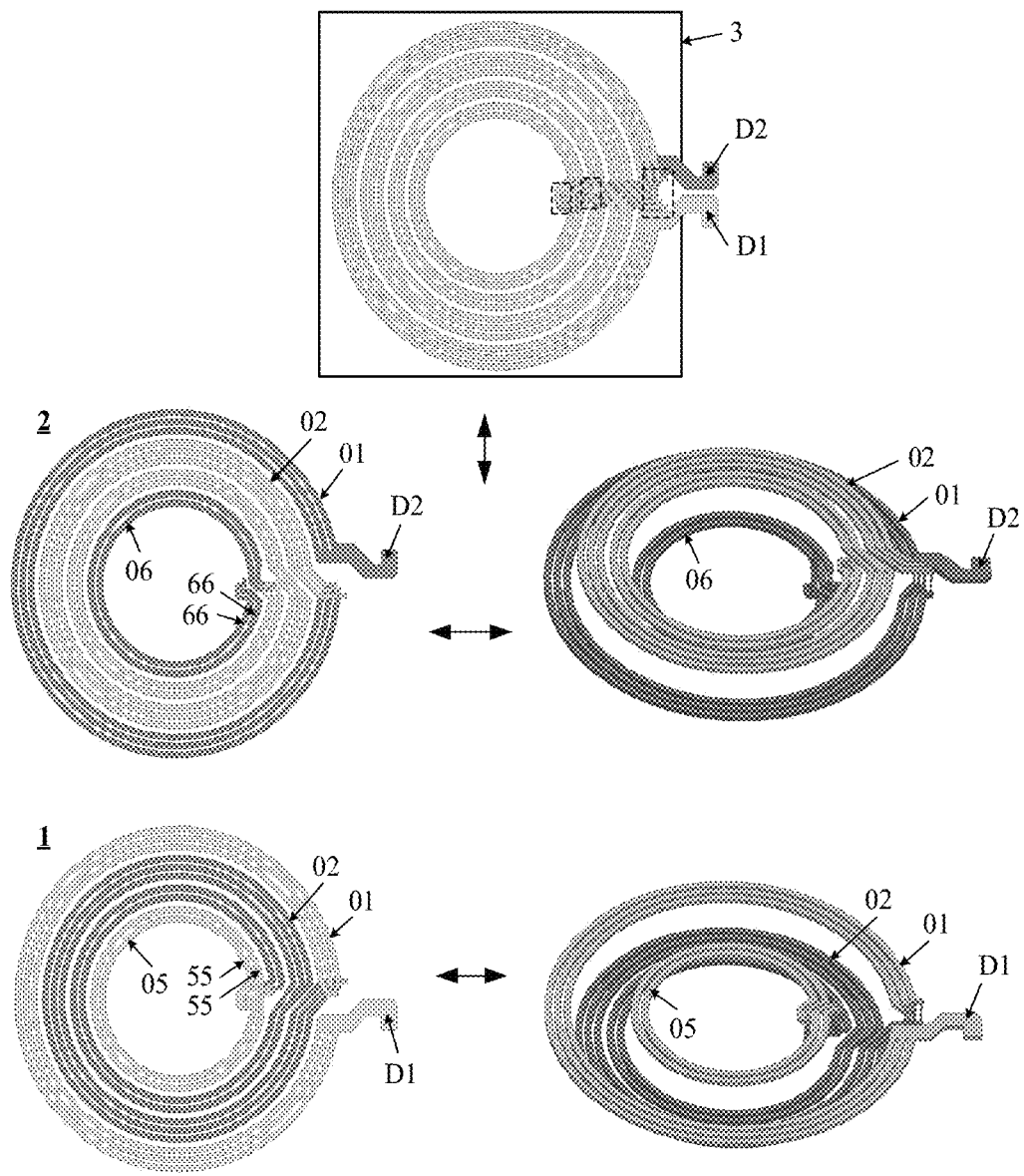
FIG. 11 is a schematic structural diagram of a third coil module according to an embodiment of this application.

A first possible structure: Referring to FIG. 9 to FIG. 11, the innermost turn of coil of the first coil winding 1 is located on one side of the insulation layer, the innermost turn of coil of the second coil winding 2 is located on the other side of the insulation layer, and an end portion of the innermost turn of coil of the second coil winding 2 is electrically connected to an end portion of the innermost turn of coil of the first coil winding 1.

It should be noted that the insulation layer is an insulating material layer between the innermost turn of coil of the first coil winding 1 and the innermost turn of coil of the second coil winding 2, and is configured to isolate the innermost turn of coil of the first coil winding 1 and the innermost turn of coil of the second coil winding 2, to keep other parts than mutually connecting parts of the two innermost turns of coils insulated. In this case, the innermost turn of coil of the first coil winding 1 and the innermost turn of coil of the second coil winding 2 are located on different planes.

In addition, a current flowing into the coil module from an external circuit or a current generated by the coil module may first flow into the first coil winding 1, then flow into the innermost turn of coil of the second coil winding 2 through the innermost turn of coil of the first coil winding 1, and finally flow out from the second coil winding 2. Alternatively, a current flowing into the coil module from an external circuit or a current generated by the coil module may first flow into the second coil winding 2, then flow into the innermost turn of coil of the first coil winding 1 through the innermost turn of coil of the second coil winding 2, and finally flow out from the first coil winding 1.

For example, referring to FIG. 9, the innermost turn of coil of the first coil winding 1 has only one end portion, and the innermost turn of coil of the second coil winding 2 also has only one end portion. The end portion of the innermost turn of coil of the second coil winding 2 is directly electrically connected to the end portion of the innermost turn of coil of the first coil winding 1.

It should be noted that a manner in which the end portion of the innermost turn of coil of the second coil winding 2 is directly electrically connected to the end portion of the innermost turn of coil of the first coil winding 1 is similar to the foregoing manner in which the first sub conducting wire 11 and the second sub conducting wire 22 are electrically connected. Details are not described again in this embodiment of this application.

For another example, referring to FIG. 10 or FIG. 11, the innermost turn of coil of the first coil winding 1 includes a fifth segment of conducting wire 05. The fifth segment of conducting wire 05 is provided with C cutting openings, and the fifth segment of conducting wire 05 is divided into C+1 fifth sub conducting wires 55 by the C cutting openings provided thereon. All end portions of the C+1 fifth sub conducting wires 55 are end portions of the innermost turn of coil of the first coil winding 1, where C is an integer greater than or equal to 1. The innermost turn of coil of the second coil winding 2 includes a sixth segment of conducting wire 06. The sixth segment of conducting wire 06 is provided with C cutting openings, and the sixth segment of conducting wire 06 is divided into C+1 sixth sub conducting wires 66 by the C cutting openings provided thereon. All end portions of the C+1 sixth sub conducting wires 66 are end portions of the innermost turn of coil of the second coil winding 2. The C+1 fifth sub conducting wires 55 and the C+1 sixth sub conducting wires 66 are electrically connected in a one-to-one manner, to form C+1 pairs of sub conducting wires. At least one crossover structure is formed in the C+1 pairs of sub conducting wires. Each pair of sub conducting wires includes one fifth sub conducting wire 55 and one sixth sub conducting wire 66.

It should be noted that a series crossover structure formed between the fifth segment of conducting wire 05 and the sixth segment of conducting wire 06 is similar to the series crossover structure formed between the first segment of conducting wire 01 and the second segment of conducting wire 02. Details are not described again in this embodiment of this application.

It should be noted that a series crossover structure is formed between the fifth segment of conducting wire 05 in the first coil winding 1 and the sixth segment of conducting wire 06 in the second coil winding 2. That is, at least one crossover structure is formed in the C+1 pairs of sub conducting wires. In this case, when a magnetic field passes through the cutting openings between the C+1 pairs of sub conducting wires, in each of at least two pairs of sub conducting wires among the C+1 pairs of sub conducting wires, an induced current generated by one fifth sub conducting wire 55 and an induced current generated by one corresponding sixth sub conducting wire 66 are opposite in direction and therefore can at least partially cancel each other. This can effectively reduce a circulating current loss in the coil module, thereby improving wireless charging efficiency of the coil module.

Optionally, C is different from N. To be specific, a segment of conducting wire in the innermost turn of coil of the first coil winding 1 and a segment of conducting wire in the innermost turn of coil of the second coil winding 2 may construct a series crossover structure, two segments of conducting wires in a relatively external coil of the first coil winding 1 may construct a series crossover structure, and two segments of conducting wires in a relatively external coil of the second coil winding 2 may construct a series crossover structure. In this way, the circulating current loss in the coil module can be further reduced.

Figure 12:
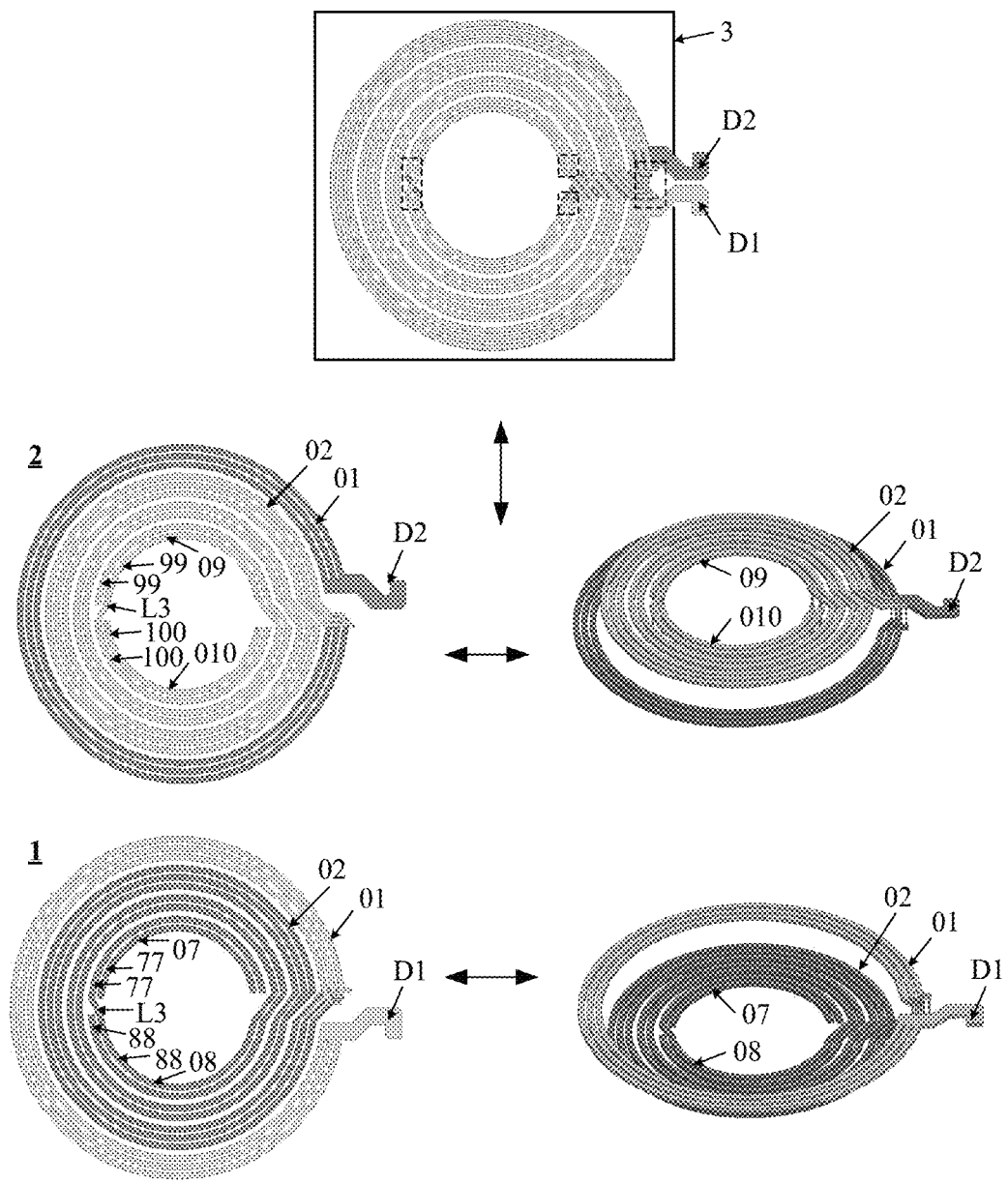
FIG. 12 is a schematic structural diagram of a fourth coil module according to an embodiment of this application.
Figure 13:
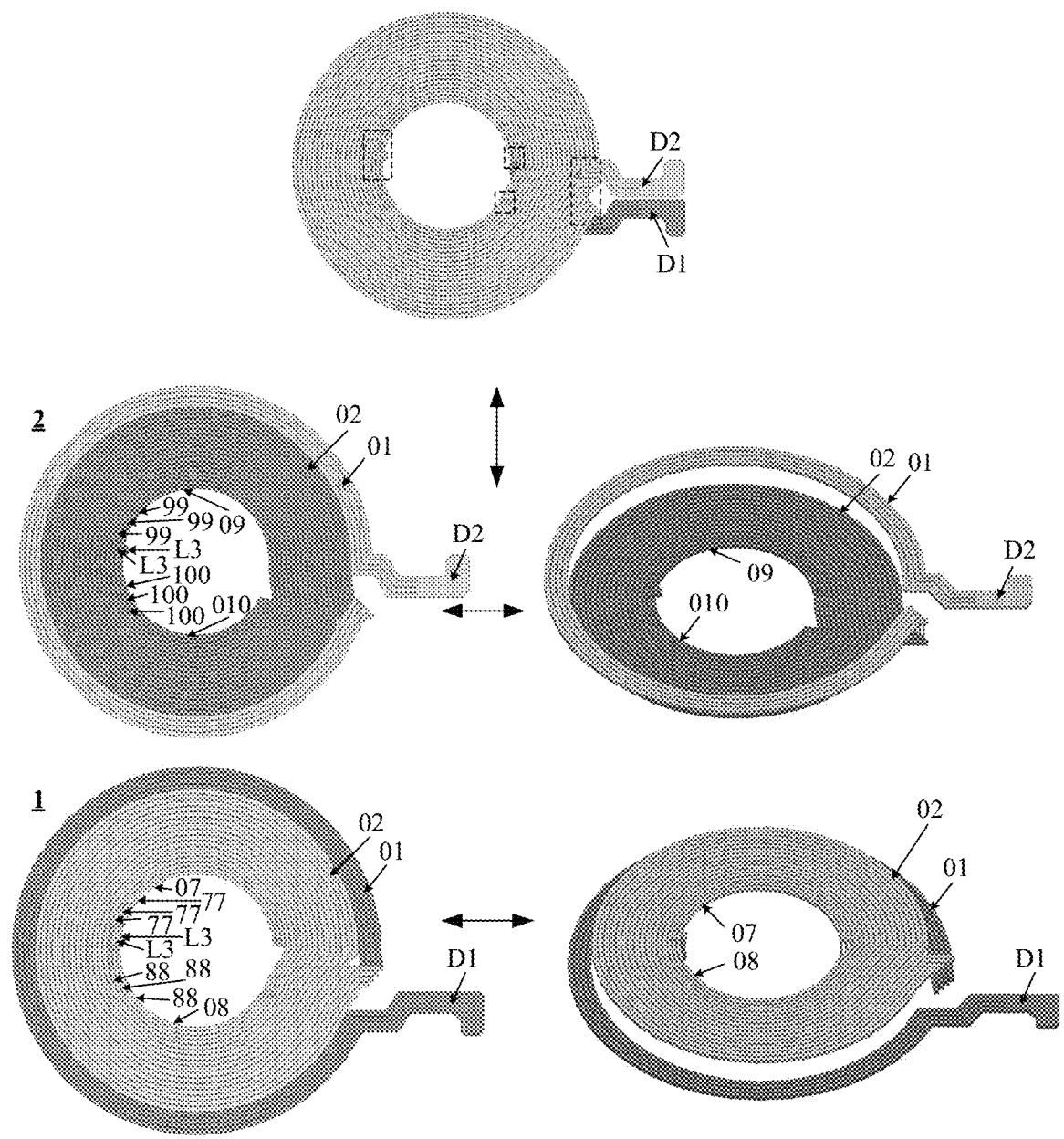
FIG. 13 is a schematic structural diagram of a fourth coil module according to an embodiment of this application.

Second possible structure: Referring to FIG. 12 or FIG. 13, the coil module may further include C+1 third connection portions L3. The C+1 third connection portions L3 are not electrically connected, where C is an integer greater than or equal to 1. The innermost turn of coil of the first coil winding 1 is located on one side of the insulation layer, and the innermost turn of coil of the second coil winding 2 is located on the other side of the insulation layer. The innermost turn of coil of the first coil winding 1 includes a seventh segment of conducting wire 07 and an eighth segment of conducting wire 08. The seventh segment of conducting wire 07 and the eighth segment of conducting wire 08 are each provided with C cutting openings. The seventh segment of conducting wire 07 is divided into C+1 seventh sub conducting wires 77 by the C cutting openings provided thereon, and the eighth segment of conducting wire 08 is divided into C+1 eighth sub conducting wires 88 by the C cutting openings provided thereon. The innermost turn of coil of the second coil winding 2 includes a ninth segment of conducting wire 09 and a tenth segment of conducting wire 010. The ninth segment of conducting wire 09 and the tenth segment of conducting wire 010 are each provided with C cutting openings. The ninth segment of conducting wire 09 is divided into C+1 ninth sub conducting wires 99 by the C cutting openings provided thereon, and the tenth segment of conducting wire 010 is divided into C+1 tenth sub conducting wires 100 by the C cutting openings provided thereon. The C+1 seventh sub conducting wires 77 and the C+1 ninth sub conducting wires 99 are connected in parallel in a one-to-one manner, and the C+1 eighth sub conducting wires 88 and the C+1 tenth sub conducting wires 100 are connected in parallel in a one-to-one manner.

The $j^{th}$ third connection portion L3 is located between the $j^{th}$ seventh sub conducting wire 77 and the $j^{th}$ eighth sub conducting wire 88, and the $j^{th}$ seventh sub conducting wire 77 and the $j^{th}$ eighth sub conducting wire 88 are electrically connected using the $j^{th}$ third connection portion L3. Alternatively, the $j^{th}$ third connection portion L3 is located between the $j^{th}$ ninth sub conducting wire 99 and the $j^{th}$ tenth sub conducting wire 100, and the $j^{th}$ ninth sub conducting wire 99 and the $j^{th}$ tenth sub conducting wire 100 are electrically connected using the $j^{th}$ third connection portion L3, where j is an integer greater than or equal to 1 and less than or equal to C+1. In this case, C+1 groups of sub conducting wires may be formed. At least one crossover structure is formed in the C+1 groups of sub conducting wires. Each group of sub conducting wires includes one seventh sub conducting wire 77, one ninth sub conducting wire 99 connected in parallel to the one seventh sub conducting wire 77, one third connection portion L3, one eighth sub conducting wire 88, and one tenth sub conducting wire 100 connected in parallel to the eighth sub conducting wire 88.

In this case, the innermost turn of coil of the first coil winding 1 and the innermost turn of coil of the second coil winding 2 are in a parallel crossover structure. Optionally, C is different from N. To be specific, the innermost turn of coil of the first coil winding 1 and the innermost turn of coil of the second coil winding 2 may construct a parallel crossover structure, two segments of conducting wires in a relatively external coil of the first coil winding 1 may construct a series crossover structure, and two segments of conducting wires in a relatively external coil of the second coil winding 2 may construct a series crossover structure. In this way, a circulating current loss in the coil module can be further reduced.

It should be noted that a current flowing into the coil module from an external circuit or a current generated by the coil module may first flow into the first coil winding 1, then flow into both the innermost turn of coil of the first coil winding 1 and the innermost turn of coil of the second coil winding 2, and finally flow out from the second coil winding 2. Alternatively, a current flowing into the coil module from an external circuit or a current generated by the coil module may first flow into the second coil winding 2, then flow into both the innermost turn of coil of the second coil winding 2 and the innermost turn of coil of the first coil winding 1, and finally flow out from the first coil winding 1.

In addition, there is an opening between the seventh segment of conducting wire 07 and the eighth segment of conducting wire 08, and there is an opening between the ninth segment of conducting wire 09 and the tenth segment of conducting wire 010. The $j^{th}$ third connection portion L3 of the C+1 third connection portions L3 is located in the opening between the seventh segment of conducting wire 07 and the eighth segment of conducting wire 08, or the $j^{th}$ third connection portion L3 is located in the opening between the ninth segment of conducting wire 09 and the tenth segment of conducting wire 010.

When the $j^{th}$ seventh sub conducting wire 77 and the $j^{th}$ ninth sub conducting wire 99 are connected in parallel, the $j^{th}$ seventh sub conducting wire 77 and the $j^{th}$ ninth sub conducting wire 99 may be connected in parallel using at least two through holes. When the $j^{th}$ eighth sub conducting wire 88 and the $j^{th}$ tenth sub conducting wire 100 are connected in parallel, the $j^{th}$ eighth sub conducting wire 88 and the $j^{th}$ tenth sub conducting wire 100 may be connected in parallel using at least two through holes.

Figure 14:
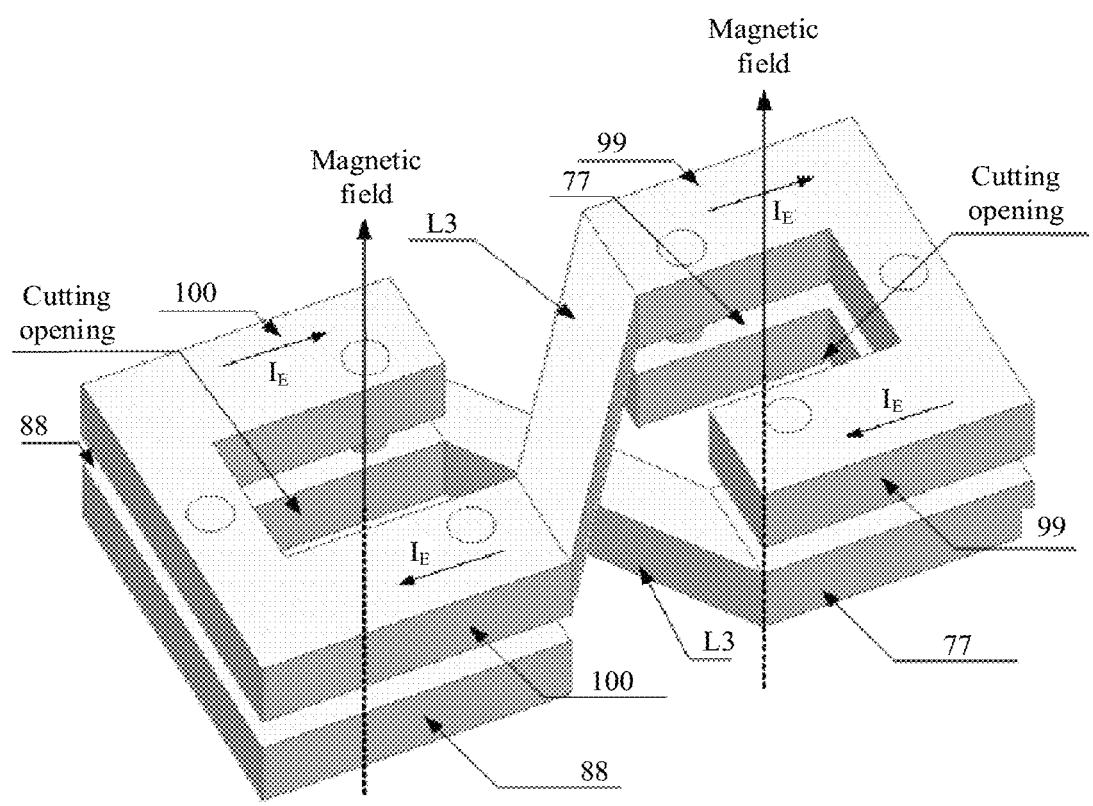
FIG. 14 is a schematic diagram of another crossover structure according to an embodiment of this application.

It should be noted that, referring to FIG. 14, a parallel crossover structure is formed between the innermost turn of coil of the first coil winding 1 and the innermost turn of coil of the second coil winding 2. That is, at least one crossover structure is formed in the C+1 groups of sub conducting wires. In this case, when a magnetic field passes through the cutting openings between the C+1 groups of sub conducting wires, in each of at least two groups of sub conducting wires among the C+1 groups of sub conducting wires, an induced current generated by one seventh sub conducting wire 77 and one ninth sub conducting wire 99 and an induced current $I_E$ generated by one corresponding eighth sub conducting wire 88 and one corresponding tenth sub conducting wire 100 are opposite in direction and therefore can at least partially cancel each other. This can effectively reduce circulating current losses in the first coil winding 1 and the second coil winding 2, thereby improving the wireless charging efficiency of the coil module.

Figure 15:
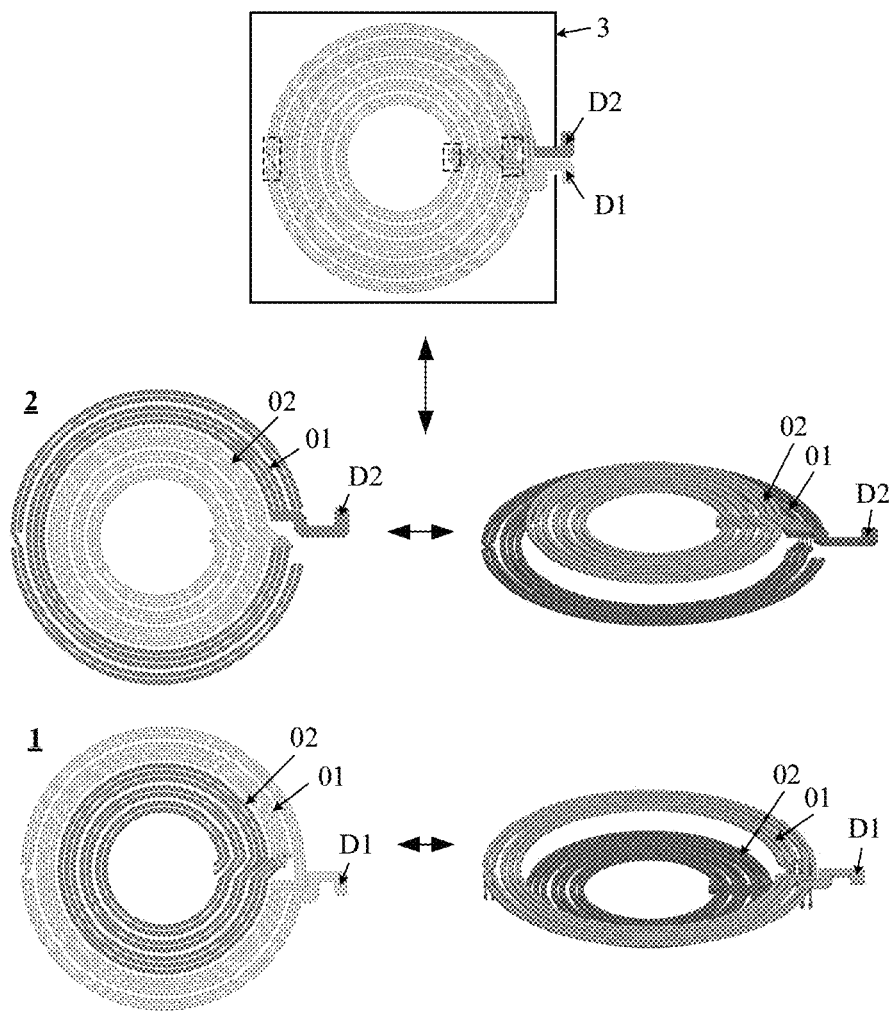
FIG. 15 is a schematic structural diagram of a fifth coil module according to an embodiment of this application.
Figure 16:
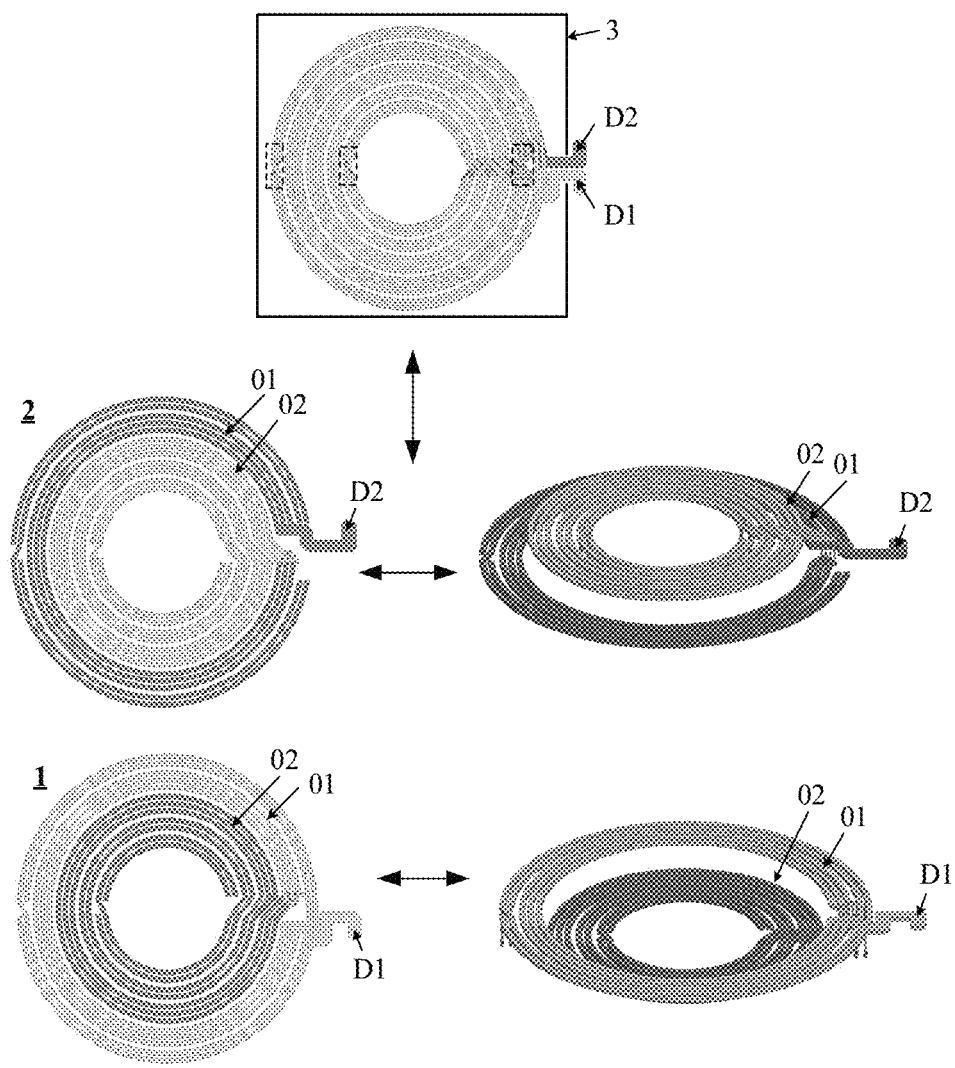
FIG. 16 is a schematic structural diagram of a sixth coil module according to an embodiment of this application.

On a basis of the foregoing first possible structure or second possible structure, referring to FIG. 15 or FIG. 16, a parallel crossover structure may also be formed between the outermost turn of coil of the first coil winding 1 and the outermost turn of coil of the second coil winding 2. The parallel crossover structure formed between the outermost turn of coil of the first coil winding 1 and the outermost turn of coil of the second coil winding 2 is similar to the foregoing second possible structure. Details are not described again in this embodiment of this application. This can further effectively reduce the circulating current losses in the first coil winding 1 and the second coil winding 2, thereby improving the wireless charging efficiency of the coil module.

In the foregoing structure, the coil module may further include an inlet end and an outlet end that are connected to an external circuit.

It should be noted that the external circuit may supply electric power to the first coil winding 1 and the second coil winding 2 using the inlet end and the outlet end, or the first coil winding 1 and the second coil winding 2 may output electric power to the external circuit using the inlet end and the outlet end. In this case, referring to FIG. 9 to FIG. 16, the coil module may include a first conducting wire D1 and a second conducting wire D2. One end of the first conducting wire D1 is a first end of the coil module, and the other end of the first conducting wire D1 is connected to an end portion of the outermost turn of coil of the first coil winding 1. A first end of the second conducting wire D2 is a second end of the coil module, and the other end of the second conducting wire D2 is connected to an end portion of the outermost turn of coil or an end portion of the second outermost turn of coil of the second coil winding 2. One of the first end of the coil module and the second end of the coil module is the outlet end, and the other one is the inlet end.

Further, referring to FIG. 9 to FIG. 16, the coil module further includes a magnetic conductive plate 3. Both the first coil winding 1 and the second coil winding 2 are located on the magnetic conductive plate 3, and are insulated from the magnetic conductive plate 3.

It should be noted that when the coil module is placed normally, the magnetic conductive plate 3 may be located beneath the first coil winding 1 and the second coil winding 2. The magnetic conductive plate 3 has a magnetic conductivity effect. This can improve inductance values of the first coil winding 1 and the second coil winding 2, and also prevent a magnetic field from leaking to space beneath the magnetic conductive plate 3, thereby exerting a desirable shielding effect on the space beneath the magnetic conductive plate 3. The magnetic conductive plate 3 may be made of one or more magnetic materials such as a ferrite, an amorphous solid, a nano-crystal, or metal powder. This embodiment of this application sets no limitation thereto.

Figure 17:
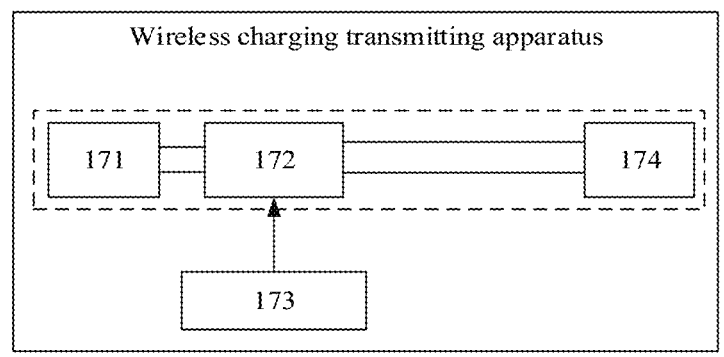
FIG. 17 is a schematic structural diagram of a first wireless charging transmitting apparatus according to an embodiment of this application.

FIG. 17 is a schematic structural diagram of a wireless charging transmitting apparatus according to an embodiment of this application. Referring to FIG. 17, the wireless charging transmitting apparatus includes a direct current/alternating current conversion circuit 172, a control unit 173, and the coil module 174 that has been described before.

An input end of the direct current/alternating current conversion circuit 172 is connected to a direct current power source 171. Under control of the control unit 173, the direct current/alternating current conversion circuit 172 converts a direct-current signal input by the direct current power source 171 into an alternating-current signal, and transmits the alternating-current signal to the coil module 174 such that the coil module 174 transmits the alternating-current signal.

An output end of the direct current/alternating current conversion circuit 172 is connected to the coil module 174. A control end of the control unit 173 is connected to a controlled end of the direct current/alternating current conversion circuit 172.

It should be noted that the wireless charging transmitting apparatus may wirelessly charge a wireless charging receiving apparatus. For example, the wireless charging transmitting apparatus may be a wireless charger.

When the wireless charging transmitting apparatus needs to wirelessly charge the wireless charging receiving apparatus, the control unit 173 may control the direct current/alternating current conversion circuit 172 to be switched on such that the direct current/alternating current conversion circuit 172 starts to work, and converts the direct-current signal input by the direct current power source 171 into the alternating-current signal.

Figure 18:
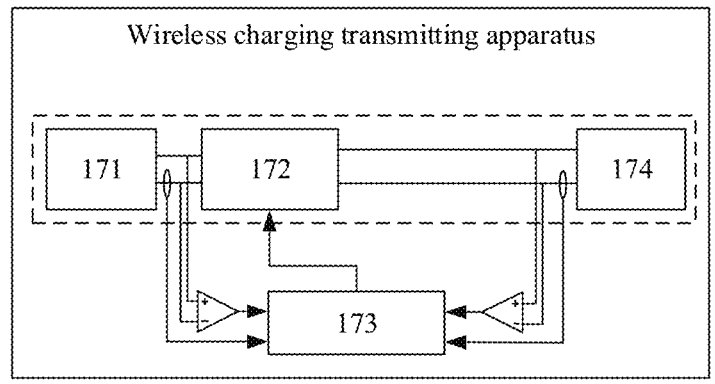
FIG. 18 is a schematic structural diagram of a second wireless charging transmitting apparatus according to an embodiment of this application.

Further, referring to FIG. 18, a first voltage detection end of the control unit 173 is connected to the direct current power source 171, a second voltage detection end of the control unit 173 is connected to the coil module 174, a first current detection end of the control unit 173 is connected to the direct current power source 171, and a second current detection end of the control unit 173 is connected to the coil module 174.

In this case, the control unit 173 may detect a voltage and current of the direct current power source 171, and detect a voltage and current of the coil module 174, and then control the direct current/alternating current conversion circuit 172 based on the detected voltages and currents.

Figure 19:
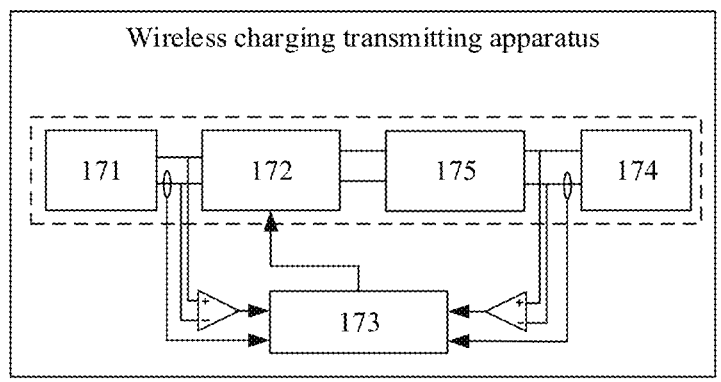
FIG. 19 is a schematic structural diagram of a third wireless charging transmitting apparatus according to an embodiment of this application.

Further, referring to FIG. 19, the wireless charging transmitting apparatus further includes a matching circuit 175. The matching circuit 175 is connected between the direct current/alternating current conversion circuit 172 and the coil module 174, and is configured to resonate with the coil module 174 such that the alternating-current signal output by the direct current/alternating current conversion circuit 172 can be efficiently transmitted to the coil module 174.

Figure 20:
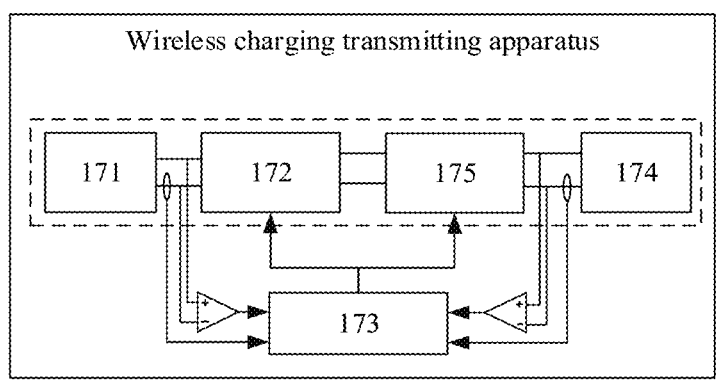
FIG. 20 is a schematic structural diagram of a fourth wireless charging transmitting apparatus according to an embodiment of this application.

Still further, referring to FIG. 20, the control end of the control unit 173 is connected to a controlled end of the matching circuit 175.

In this case, when the wireless charging transmitting apparatus needs to wirelessly charge the wireless charging receiving apparatus, the control unit 173 may control the matching circuit 175 to be switched on such that the matching circuit 175 starts to work, and resonates with the coil module 174.

In this embodiment of this application, the wireless charging transmitting apparatus includes the coil module 174, and a circulating current loss of the coil module 174 is relatively small. Therefore, wireless charging efficiency of the wireless charging transmitting apparatus can be improved.

Figure 21:
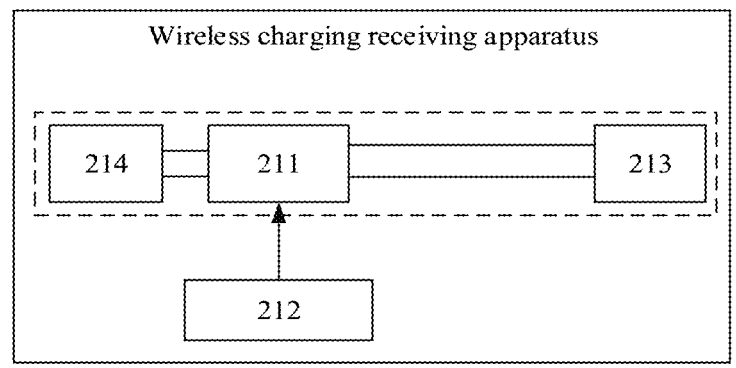
FIG. 21 is a schematic structural diagram of a first wireless charging receiving apparatus according to an embodiment of this application.

FIG. 21 is a schematic structural diagram of a wireless charging receiving apparatus according to an embodiment of this application. Referring to FIG. 21, the wireless charging receiving apparatus includes an alternating current/direct current conversion circuit 211, a control unit 212, a load 213, and a coil module 214.

The coil module 214 is connected to an input end of the alternating current/direct current conversion circuit 211. The coil module 214 receives an alternating-current signal, and transmits the alternating-current signal to the alternating current/direct current conversion circuit 211. Under control of the control unit 212, the alternating current/direct current conversion circuit 211 converts the alternating-current signal into a direct-current signal, and outputs the direct-current signal to the load 213, to supply power to the load 213.

An output end of the alternating current/direct current conversion circuit 211 is connected to the load 213. A control end of the control unit 212 is connected to a controlled end of the alternating current/direct current conversion circuit 211.

It should be noted that the wireless charging receiving apparatus may be wirelessly charged using a wireless charging transmitting apparatus. For example, the wireless charging receiving apparatus may be an electronic device such as a mobile phone or a tablet computer.

When the wireless charging receiving apparatus needs to be wirelessly charged using the wireless charging transmitting apparatus, the control unit 212 may control the alternating current/direct current conversion circuit 211 to be switched on such that the alternating current/direct current conversion circuit 211 starts to work, converts the alternating-current signal input by the coil module 214 into the direct-current signal, and outputs the direct-current signal to the load 213.

Figure 22:
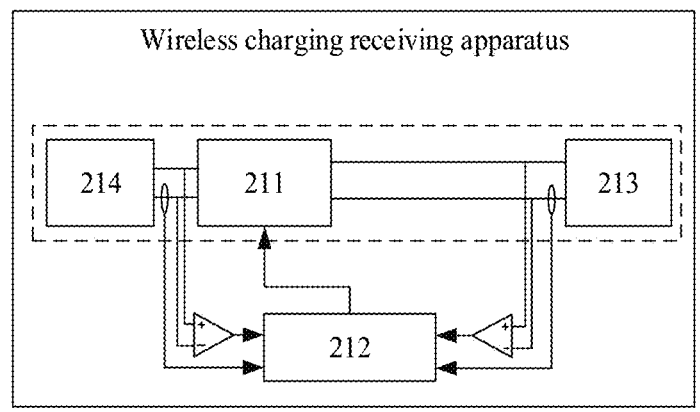
FIG. 22 is a schematic structural diagram of a second wireless charging receiving apparatus according to an embodiment of this application.

Further, referring to FIG. 22, a first voltage detection end of the control unit 212 is connected to the coil module 214, a second voltage detection end of the control unit 212 is connected to the load 213, a first current detection end of the control unit 212 is connected to the coil module 214, and a second current detection end of the control unit 212 is connected to the load 213.

In this case, the control unit 212 may detect a voltage and current of the coil module 214, and detect a voltage and current of the load 213, and then control the alternating current/direct current conversion circuit 211 based on the detected voltages and currents.

Figure 23:
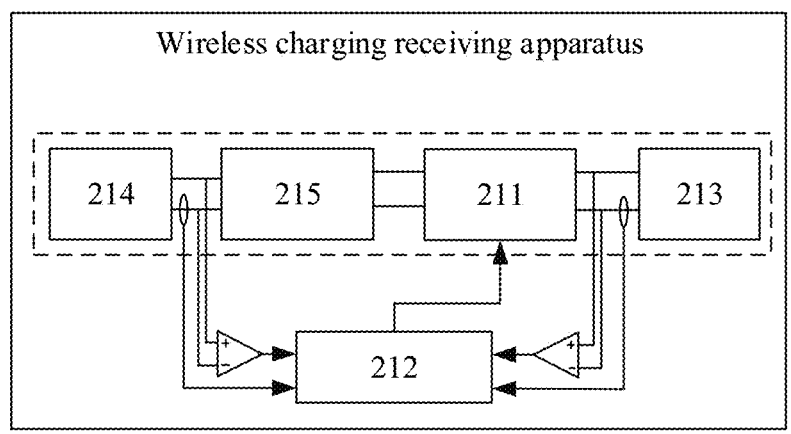
FIG. 23 is a schematic structural diagram of a third wireless charging receiving apparatus according to an embodiment of this application.

Further, referring to FIG. 23, the wireless charging receiving apparatus further includes a matching circuit 215. The matching circuit 215 is connected between the coil module 214 and the alternating current/direct current conversion circuit 211, and is configured to resonate with the coil module 214 such that the alternating-current signal output by the coil module 214 can be efficiently transmitted to the alternating current/direct current conversion circuit 211.

Figure 24:
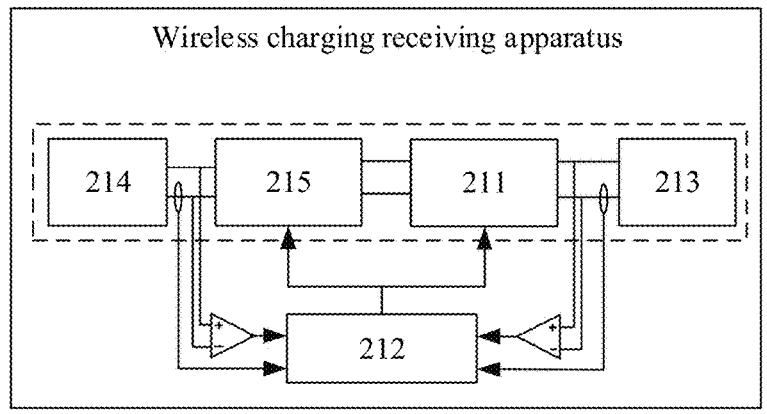
FIG. 24 is a schematic structural diagram of a fourth wireless charging receiving apparatus according to an embodiment of this application.

Still further, referring to FIG. 24, the control end of the control unit 212 is connected to a controlled end of the matching circuit 215.

In this case, when the wireless charging receiving apparatus needs to be wirelessly charged using the wireless charging transmitting apparatus, the control unit 212 may control the matching circuit 215 to be switched on such that the matching circuit 215 starts to work, and resonates with the coil module 214.

In this embodiment of this application, the wireless charging receiving apparatus includes the coil module 214, and a circulating current loss of the coil module 214 is relatively small. Therefore, wireless charging efficiency of the wireless charging receiving apparatus can be improved.

Figure 25:
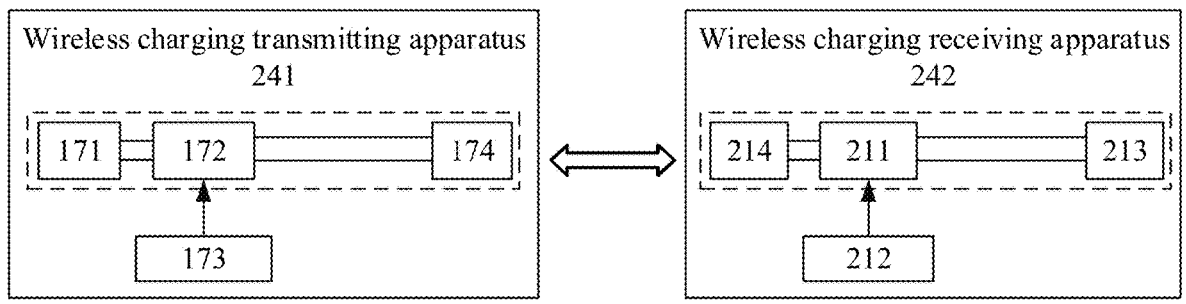
FIG. 25 is a schematic structural diagram of a wireless charging system according to an embodiment of this application.

FIG. 25 is a schematic structural diagram of a wireless charging system according to an embodiment of this application. Referring to FIG. 25, the wireless charging system includes the wireless charging transmitting apparatus 251 and the wireless charging receiving apparatus 252. The wireless charging transmitting apparatus is configured to wirelessly charge the wireless charging receiving apparatus.

It should be noted that, an alternating-current signal transmitted by a coil module in the wireless charging transmitting apparatus generates a magnetic field, and a coil module in the wireless charging receiving apparatus can generate a voltage through magnetic coupling such that the wireless charging transmitting apparatus can wirelessly charge a load in the wireless charging receiving apparatus.

In this embodiment of this application, the wireless charging system includes the wireless charging transmitting apparatus and the wireless charging receiving apparatus. The wireless charging transmitting apparatus and the wireless charging receiving apparatus each include a coil module, and a circulating current loss of the coil module is relatively small. Therefore, wireless charging efficiency of the wireless charging system can be improved.

Figure 26:
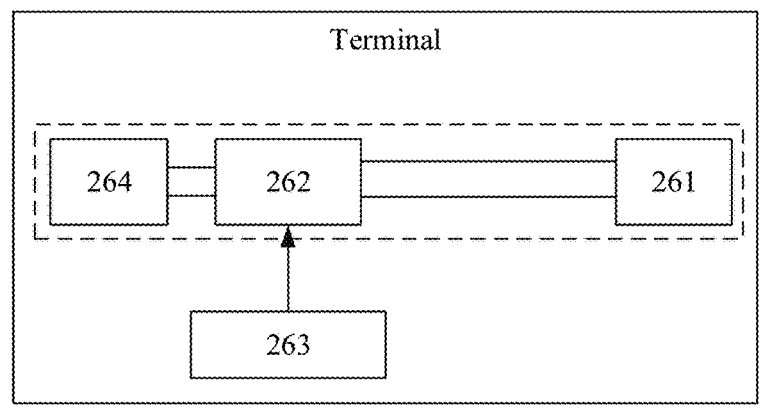
FIG. 26 is a schematic structural diagram of a first terminal according to an embodiment of this application.

FIG. 26 is a schematic structural diagram of a terminal according to an embodiment of this application. Referring to FIG. 26, the terminal includes a workload circuit 261, an alternating current/direct current conversion circuit 262, a charging control unit 263, and the coil module 264.

The coil module 264 is connected to an input end of the alternating current/direct current conversion circuit 262. The coil module 264 receives an alternating-current signal, and transmits the alternating-current signal to the alternating current/direct current conversion circuit 262. Under control of the charging control unit 263, the alternating current/direct current conversion circuit 262 converts the alternating-current signal into a direct-current signal, and outputs the direct-current signal to the workload circuit 261.

An output end of the alternating current/direct current conversion circuit 262 is connected to the workload circuit 261. A control end of the charging control unit 263 is connected to a controlled end of the alternating current/direct current conversion circuit 262.

It should be noted that the terminal may be an electronic device such as a mobile phone or a tablet computer.

When the terminal needs to be wirelessly charged using a wireless charger, the charging control unit 263 may control the alternating current/direct current conversion circuit 262 to be switched on such that the alternating current/direct current conversion circuit 262 starts to work, converts the alternating-current signal input by the coil module 264 into the direct-current signal, and outputs the direct-current signal to the workload circuit 261.

Figure 27:
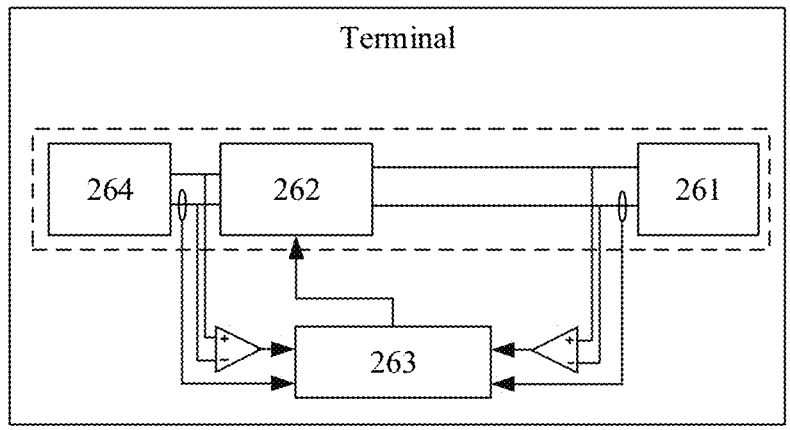
FIG. 27 is a schematic structural diagram of a second terminal according to an embodiment of this application.

Further, referring to FIG. 27, a first voltage detection end of the charging control unit 263 is connected to the coil module 264, a second voltage detection end of the charging control unit 263 is connected to the workload circuit 261, a first current detection end of the charging control unit 263 is connected to the coil module 264, and a second current detection end of the charging control unit 263 is connected to the workload circuit 261.

In this case, the charging control unit 263 may detect a voltage and current of the coil module 264, and detect a voltage and current of the workload circuit 261, and then control the alternating current/direct current conversion circuit 262 based on the detected voltages and currents.

Figure 28:
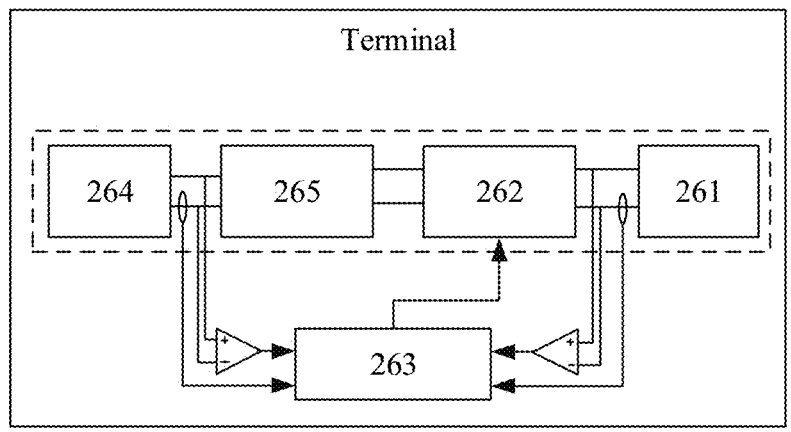
FIG. 28 is a schematic structural diagram of a third terminal according to an embodiment of this application.

Further, referring to FIG. 28, the terminal further includes a matching circuit 265. The matching circuit 265 is connected between the coil module 264 and the alternating current/direct current conversion circuit 262, and is configured to resonate with the coil module 264 such that the alternating-current signal output by the coil module 264 can be efficiently transmitted to the alternating current/direct current conversion circuit 262.

Figure 29:
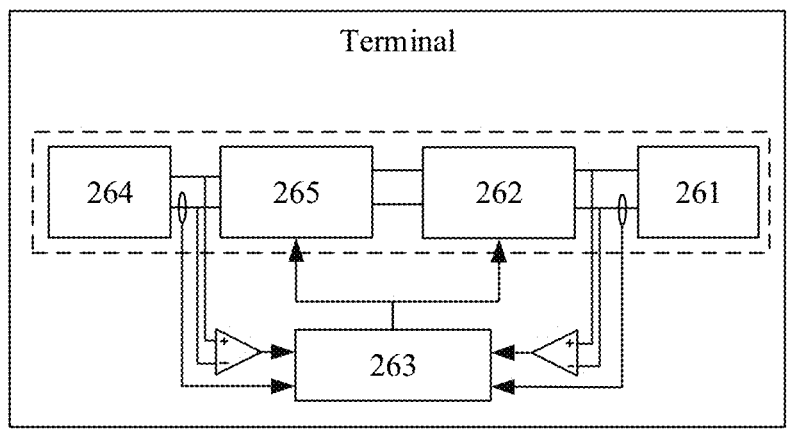
FIG. 29 is a schematic structural diagram of a fourth terminal according to an embodiment of this application.

Still further, referring to FIG. 29, the control end of the charging control unit 263 is connected to a controlled end of the matching circuit 265.

In this case, when the terminal needs to be wirelessly charged using a wireless charger, the charging control unit 263 may control the matching circuit 265 to be switched on such that the matching circuit 265 starts to work, and resonates with the coil module 264.

In this embodiment of this application, the terminal includes the coil module 264, and a circulating current loss of the coil module 264 is relatively small. Therefore, wireless charging efficiency of the terminal can be improved.

The foregoing descriptions are merely embodiments of this application, but are not intended to limit this application. Any modification, equivalent replacement, improvement, or the like made without departing from the spirit and principle of this application should fall within the protection scope of this application.

What is claimed is:

1. A coil winding comprising:
    a insulation layer comprising:
        a first side; and
        a second side; and
    a plurality of coils comprising:
        a first part located on the first side and comprising a first segment of a conducting wire, wherein the first segment comprises N first cutting openings that extend along a first extension direction of the first segment and are configured to divide the first segment into N+1 first sub conducting wires; and
        a second part located on the second side and comprising a second segment of the conducting wire, wherein the second segment comprises N second cutting openings that extend along a second extension direction of the second segment and are configured to divide the second segment into N+1 second sub conducting wires,
        wherein N is an integer greater than or equal to 1, and
        wherein the N+1 first sub conducting wires and the N+1 second sub conducting wires are electrically coupled in a one-to-one manner to form a plurality of N+1 pairs of sub conducting wires comprising a first crossover structure.

2. The coil winding of claim 1, further comprising a second crossover structure between each of the N+1 pairs of the sub conducting wires and a first pair of the N+1 pairs of the sub conducting wires.

3. The coil winding of claim 1, further comprising a third crossover structure between a first pair of the N+1 pairs of the sub conducting wires and a second pair of the N+1 pairs of the sub conducting wires.

4. The coil winding of claim 1, wherein a first projection of the first segment on a first plane on which the insulation layer is located and a second projection of the second segment on the first plane form a continuous line pattern, wherein a first length of the continuous line pattern is greater than a second length of a longest of the first segment and the second segment, and wherein the first length is less than a sum of a third length of the first segment and a fourth length of the second segment.

5. The coil winding of claim 1, wherein the coil winding does not comprise a planar coil winding.

6. The coil winding of claim 1, wherein the first segment comprises at least three first sub conducting wires and the second segment comprises at least three second sub conducting wires when N is greater than or equal to 2.

7. The coil winding of claim 1, wherein the N first cutting openings are configured to generate a first induced current using a first magnetic field passing through the N first cutting openings, wherein the N second cutting openings are configured to generate a second induced current using a second magnetic field passing through the N second cutting openings, and wherein the first induced current and the second induced current are opposite in direction and equal in size.

8. A coil system comprising:
    a first insulation layer comprising:
        a first side; and
        a second side;
    a first coil winding located on the first side and comprising:
        a second insulation layer comprising:
            a third side; and
            a fourth side; and
        a plurality of first coils comprising:
            a first part located on the third side and comprising a first segment of a first conducting wire, wherein the first segment comprises N first cutting openings that extend along a first extension direction of the first segment and are configured to divide the first segment into N+1 first sub conducting wires; and
            a second part located on the fourth side and comprising a second segment of the first conducting wire, wherein the second segment comprises N second cutting openings that extend along a second extension direction of the second segment and are configured to divide the second segment into N+1 second sub conducting wires; and
    a second coil winding located on the second side and comprising:
        a third insulation layer comprising:
            a fifth side; and
            a sixth side; and
        a plurality of second coils comprising:
            a third part located on the fifth side and comprising a third segment of a second conducting wire, wherein the third segment comprises N third cutting openings that extend along a third extension direction of the third segment and are configured to divide the third segment into N+1 third sub conducting wires; and
            a fourth part located on the sixth side and comprising a fourth segment of the second conducting wire, wherein the second segment comprises N fourth cutting openings that extend along a fourth extension direction of the fourth segment and are configured to divide the fourth segment into N+1 fourth sub conducting wires,
            wherein N is an integer greater than or equal to 1,
            wherein the N+1 first sub conducting wires and the N+1 second sub conducting wires are electrically coupled in a one-to-one manner to form a plurality of N+1 pairs of fifth sub conducting wires comprising a first crossover structure, and
            wherein the N+1 third sub conducting wires and the N+1 fourth sub conducting wires are electrically coupled in a one-to-one manner to form a plurality of N+1 pairs of sixth sub conducting wires comprising a second crossover structure.

9. The coil system of claim 8, wherein the first part and the fourth part are located on the first side, and wherein the second part and the third part are located on the second side.

10. The coil system of claim 8, wherein the first part and the fourth part are located in a same planar coil and are not in contact with each other.

11. The coil system of claim 8, wherein the second part and the third part are located in a same planar coil and are not in contact with each other.

12. The coil system of claim 8, further comprising:
a first innermost turn of the first coils located on the first side and comprising a first end portion;
a second innermost turn of the second coils located on the second side and comprising a second end portion electrically coupled to the first end portion.

13. The coil system of claim 8, further comprising:
a third crossover structure between each of the N+1 pairs of the fifth sub conducting wires and a first pair of the N+1 pairs of the fifth sub conducting wires; and
a fourth crossover structure between each of the N+1 pairs of the sixth sub conducting wires and a second pair of the N+1 pairs of the sixth sub conducting wires.

14. The coil system of claim 8, wherein the N first cutting openings are configured to generate a first induced current using a first magnetic field passing through the N first cutting openings, wherein the N second cutting openings are configured to generate a second induced current using a second magnetic field passing through the N second cutting openings, wherein the first induced current and the second induced current are opposite in direction and equal in size, wherein the N third cutting openings are configured to generate a third induced current using a third magnetic field passing through the N third cutting openings, wherein the N fourth cutting openings are configured to generate a fourth induced current using a fourth magnetic field passing through the N fourth cutting openings, and wherein the third induced current and the fourth induced current are opposite in direction and equal in size.

15. A terminal comprising:
a workload circuit;
an alternating current/direct current conversion circuit coupled to the workload circuit and comprising an input end;
a coil system coupled to the input end and comprising:
a first insulation layer comprising:
a first side; and
a second side;
a first coil winding located on the first side and comprising:
a second insulation layer comprising:
a third side; and
a fourth side; and
a plurality of first coils comprising:
a first part located on the third side and comprising a first segment of a first conducting wire, wherein the first segment comprises N first cutting openings that extend along a first extension direction of the first segment and are configured to divide the first segment into N+1 first sub conducting wires; and
a second part located on the fourth side and comprising a second segment of the first conducting wire, wherein the second segment comprises N second cutting openings that extend along a second extension direction of the second segment and are configured to divide the second segment into N+1 second sub conducting wires; and
a second coil winding located on the second side and comprising:
a third insulation layer comprising:
a fifth side; and
a sixth side; and
a plurality of second coils comprising:
a third part located on the fifth side and comprising a third segment of a second conducting wire, wherein the third segment comprises N third cutting openings that extend along a third extension direction of the third segment and are configured to divide the third segment into N+1 third sub conducting wires; and
a fourth part located on the sixth side comprising a fourth segment of the second conducting wire, wherein the fourth segment comprises N fourth cutting openings that extend along a fourth extension direction of the fourth segment and are configured to divide the fourth segment into N+1 fourth sub conducting wires,
wherein N is an integer greater than or equal to 1,
wherein the N+1 first sub conducting wires and the N+1 second sub conducting wires are electrically coupled in a one-to-one manner to form a plurality of N+1 pairs of fifth sub conducting wires comprising a first crossover structure,
wherein the N+1 third sub conducting wires and the N+1 fourth sub conducting wires are electrically coupled in a one-to-one manner to form a plurality of N+1 pairs of sixth sub conducting wires comprising a second crossover structure, and
wherein the coil system is configured to:
receive an alternating-current signal; and
transmit the alternating-current signal to the alternating current/direct current conversion circuit; and
a charging control system coupled to the alternating current/direct current conversion circuit and configured to control the alternating current/direct current conversion circuit to:
convert the alternating-current signal into a direct-current signal; and
output the direct-current signal to the workload circuit.

16. The terminal of claim 15, further comprising:
a third crossover structure between each of the N+1 pairs of the fifth sub conducting wires and a first pair of the N+1 pairs of the fifth sub conducting wires; and
a fourth crossover structure between each of the N+1 pairs of the sixth sub conducting wires and a second pair of the N+1 pairs of the sixth sub conducting wires.

17. The terminal of claim 15, wherein the N first cutting openings are configured to generate a first induced current using a first magnetic field passing through the N first cutting openings, wherein the N second cutting openings are configured to generate a second induced current using a second magnetic field passing through the N second cutting openings, wherein the first induced current and the second induced current are opposite in direction and equal in size, wherein the N third cutting openings are configured to generate a third induced current using a third magnetic field passing through the N third cutting openings, wherein the N fourth cutting openings are configured to generate a fourth induced current using a fourth magnetic field passing through the N fourth cutting openings, and wherein the third induced current and the fourth induced current are opposite in direction and equal in size.

18. The terminal of claim 15, wherein the first part and the fourth part are located on the first side, and wherein the second part and the third part are located on the second side.

19. The terminal of claim 15, wherein the first part and the fourth part are located in a same planar coil and are not in contact with each other.

20. The terminal of claim 15, wherein the second part and the third part are located in a same planar coil and are not in contact with each other.

* * * * *

UNITED STATES PATENT AND TRADEMARK OFFICE
CERTIFICATE OF CORRECTION

| | | |
|---|---|---|
| PATENT NO. | : 11,887,773 B2 | Page 1 of 1 |
| APPLICATION NO. | : 17/158629 | |
| DATED | : January 30, 2024 | |
| INVENTOR(S) | : Yongfa Zhu, Xiaowei Chen and Zhiqiang Zeng | |

It is certified that error appears in the above-identified patent and that said Letters Patent is hereby corrected as shown below:

On the Title Page

Item (56), U.S. PATENT DOCUMENTS: 2016/0315502 A1 10/2016 King et al. should read 2016/0315502 A1 10/2016 Xing et al.

Signed and Sealed this
Second Day of April, 2024

Katherine Kelly Vidal
*Director of the United States Patent and Trademark Office*